US012573068B2

(12) United States Patent　　　(10) Patent No.:　US 12,573,068 B2
Shino et al.　　　　　　　　　　　(45) Date of Patent:　　Mar. 10, 2026

(54) IMAGE PROCESSING DEVICE, CONTROL METHOD AND STORAGE MEDIUM

(71) Applicant: NEC Corporation, Tokyo (JP)

(72) Inventors: Ryosaku Shino, Tokyo (JP); Kenichi Kamijo, Tokyo (JP); Shota Ohtsuka, Tokyo (JP); Tatsu Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 627 days.

(21) Appl. No.: 17/925,530

(22) PCT Filed: May 21, 2020

(86) PCT No.: PCT/JP2020/020112
　　　§ 371 (c)(1),
　　　(2) Date: Nov. 15, 2022

(87) PCT Pub. No.: WO2021/234907
　　　PCT Pub. Date: Nov. 25, 2021

(65) Prior Publication Data
　　　US 2023/0194850 A1　　Jun. 22, 2023

(51) Int. Cl.
　　　*G06T 7/55*　　　　(2017.01)
　　　*G06T 1/60*　　　　(2006.01)
　　　(Continued)

(52) U.S. Cl.
　　　CPC .................. *G06T 7/55* (2017.01); *G06T 1/60* (2013.01); *G06T 15/005* (2013.01);
　　　(Continued)

(58) Field of Classification Search
　　　CPC ....................................................... G06T 7/55
　　　See application file for complete search history.

(56) References Cited

U.S. PATENT DOCUMENTS 8,449,529 B2 * 5/2013 Bek ........................ A61B 18/00
　　　　　　　　　　　　　　　　　　　　606/1
10,223,591 B1 * 3/2019 Goldenberg ........... G06V 10/25
　　　　　　　　　　　　(Continued)

FOREIGN PATENT DOCUMENTS

JP　　　2010-516305 A　　5/2010
WO　　2012/014438 A1　　2/2012
　　　　　　(Continued)

OTHER PUBLICATIONS

International Search Report for PCT Application No. PCT/JP2020/020112, mailed on Jul. 14, 2020.
(Continued)

*Primary Examiner* — Kevin Ky
(74) *Attorney, Agent, or Firm* — Sughrue Mion, PLLC

(57) ABSTRACT

An image processing device 1X includes a three-dimensional reconstruction means 31X, a matching means 32X, and an output control means 33X. The three-dimensional reconstruction means 31X generates reconstruction data Mr acquired by three-dimensionally reconstructing an inspection target on a basis of captured images Ic which a photographing unit provided in an endoscope generates by photographing the inspection target. The matching means 32X performs matching between a standard model "Ms", which is a standard three-dimensional model of the inspection target, and the reconstruction data Mr. The output control means 33X displays on a display device 2X a photographed area indication image indicating a photographed area of the inspection target on the standard model based on a result of the matching.

21 Claims, 17 Drawing Sheets

<u>100</u>: ENDOSCOPIC INSPECTION SYSTEM

(51) Int. Cl.
    *G06T 15/00*         (2011.01)
    *H04N 23/63*      (2023.01)

(52) U.S. Cl.
    CPC ......... *H04N 23/631* (2023.01); *H04N 23/634*
        (2023.01); *G06T 2200/24* (2013.01); *G06T*
        *2207/10068* (2013.01); *G06T 2207/20101*
        (2013.01); *G06T 2207/30096* (2013.01); *G06T*
        *2207/30101* (2013.01)

(56)            References Cited

U.S. PATENT DOCUMENTS

| | | | |
|---|---|---|---|
| 10,413,157 B2 * | 9/2019 | Minamizato ..... | A61B 1/000095 |
| 10,645,294 B1 * | 5/2020 | Manzari ................. | H04N 23/74 |
| 2008/0177138 A1 | 7/2008 | Courtney et al. | |
| 2008/0177139 A1 | 7/2008 | Courtney et al. | |
| 2008/0177183 A1 | 7/2008 | Courtney et al. | |
| 2008/0243002 A1 | 10/2008 | Munce et al. | |
| 2009/0207242 A1 * | 8/2009 | Iwasaki .............. | G02B 23/2484 |
| | | | 348/E7.085 |
| 2009/0264768 A1 | 10/2009 | Courtney et al. | |
| 2013/0345556 A1 | 12/2013 | Courtney et al. | |
| 2014/0323860 A1 | 10/2014 | Courtney et al. | |
| 2014/0323877 A1 | 10/2014 | Courtney et al. | |
| 2015/0305600 A1 | 10/2015 | Minamizato et al. | |
| 2016/0073927 A1 | 3/2016 | Akimoto et al. | |
| 2016/0278612 A1 | 9/2016 | Minamizato et al. | |
| 2016/0302763 A1 | 10/2016 | Courtney et al. | |
| 2017/0039707 A1 | 2/2017 | Akimoto et al. | |
| 2019/0043215 A1 | 2/2019 | Ito et al. | |
| 2019/0090954 A1 * | 3/2019 | Kotian ................... | H04N 23/90 |
| 2020/0096637 A1 * | 3/2020 | Ulrich ..................... | G01S 7/497 |
| 2020/0242330 A1 * | 7/2020 | Blondel .............. | G06V 20/647 |
| 2020/0289086 A1 | 9/2020 | Courtney et al. | |
| 2022/0031165 A1 | 2/2022 | Courtney et al. | |
| 2023/0194850 A1 * | 6/2023 | Shino ................ | A61B 1/00009 |
| | | | 382/128 |
| 2024/0270295 A1 * | 8/2024 | Jordan .................. | B61L 23/042 |
| 2025/0278824 A1 * | 9/2025 | Oshima ................ | G06T 7/0004 |

FOREIGN PATENT DOCUMENTS

| | | |
|---|---|---|
| WO | 2014/148184 A1 | 9/2014 |
| WO | 2015/049962 A1 | 4/2015 |
| WO | 2015/194242 A1 | 12/2015 |
| WO | 2017/203814 A1 | 11/2017 |

OTHER PUBLICATIONS

Aji Resindra Widya et al. "3D Reconstruction of Whole Stomach from Endoscope Video Using Structure-from-Motion", 2019 41st Annual International Conference of the IEEE Engineering in Medicine and Biology Society, pp. 3900-3904.

Dai, H et al. "Non-rigid 3D Shape Registration using an Adaptive Template", The European Conference on Computer Vision (ECCV) Workshops, 2018.

Extended European Search Report for EP Application No. 20936555. 0, dated on Jun. 13, 2023.

JP Office Action for JP Application No. 2022-524803, mailed on Aug. 13, 2024 with English Translation.

\* cited by examiner

<u>100</u>:ENDOSCOPIC INSPECTION SYSTEM

THREE-DIMENSIONAL
RECONSTRUCTION

RECONSTRUCTION DATA Mr

MATCHING

STANDARD MODEL Ms

FIG. 12

PLEASE BACK BY 3cm

FIG. 13

PLEASE MOVE TOWARD ARROW DIRECTION
TO SHOOT NON-PHOTOGRAPHED AREA

FIG. 14

A LESION PART DETECTED PREVIOUSLY

IMAGE PROCESSING DEVICE, CONTROL METHOD AND STORAGE MEDIUM

This application is a National Stage Entry of PCT/JP2020/020112 filed on May 21, 2020, the contents of all of which are incorporated herein by reference, in their entirety.

TECHNICAL FIELD

The present disclosure relates to a technical field of an image processing device, a control method, and a storage medium for process an image acquired in endoscopic inspection.

BACKGROUND ART

An endoscopic system for displaying images taken in the lumen of an organ is known. For example, Patent Literature 1 discloses a technique for generating, on the basis of images taken by endoscope, three-dimensional model data of the inspection target to thereby display a three-dimensional model image. In addition, Non-Patent Literature 1 discloses a technique for reconstructing the three-dimensional shape of a stomach from captured images using the SfM (Structure from Motion) method. Furthermore, Non-Patent Literature 2 discloses a non-rigid alignment method of three-dimensional shapes.

CITATION LIST

Patent Literature

Patent Literature 1: WO2017/203814

Non-Patent Literature

Non-Patent Literature 1: Aji Resindra Widya et al. "3D Reconstruction of Whole Stomach from Endoscope Video Using Structure-from-Motion", 2019 41st Annual International Conference of the IEEE Engineering in Medicine and Biology Society, pp. 3900-3904.
Non-Patent Literature 2: Dai, H et al. "Non-rigid 3D Shape Registration using an Adaptive Template", The European Conference on Computer Vision (ECCV) Workshops, 2018.

SUMMARY

Problem to be Solved by the Invention

In the endoscopic inspection, the inspector needs to move the photographing unit of the endoscope to an area of the inspection target where the photographing is not carried out. However, it is difficult to accurately distinguish the area where the photographing is not carried out from the already-photographed area.

In view of the above-described issue, it is therefore an example object of the present disclosure to provide an image processing device, a control method, and a storage medium capable of suitably displaying a photographed area of the inspection target in endoscope inspection.

Means for Solving the Problem

One mode of the image processing device is an image processing device including: a three-dimensional reconstruction means for generating reconstruction data acquired by three-dimensionally reconstructing an inspection target on a basis of captured images which a photographing unit provided in an endoscope generates by photographing the inspection target; a matching means for performing matching between a standard model, which is a standard three-dimensional model of the inspection target, and the reconstruction data; and an output control means for displaying on a display device a photographed area indication image indicating a photographed area of the inspection target on the standard model based on a result of the matching.

One mode of the control method is a control method executed by a computer, the control method including: generating reconstruction data acquired by three-dimensionally reconstructing an inspection target on a basis of captured images which a photographing unit provided in an endoscope generates by photographing the inspection target; performing matching between a standard model, which is a standard three-dimensional model of the inspection target, and the reconstruction data; and displaying on a display device a photographed area indication image indicating a photographed area of the inspection target on the standard model based on a result of the matching.

One mode of the storage medium is a storage medium storing a program executed by a computer, the program causing the computer to function as: a three-dimensional reconstruction means for generating reconstruction data acquired by three-dimensionally reconstructing an inspection target on a basis of captured images which a photographing unit provided in an endoscope generates by photographing the inspection target; a matching means for performing matching between a standard model, which is a standard three-dimensional model of the inspection target, and the reconstruction data; and an output control means for displaying on a display device a photographed area indication image indicating a photographed area of the inspection target on the standard model based on a result of the matching.

Effect of the Invention

An example advantage according to the present invention is to suitably display the photographed area of an inspection target in endoscopic inspection.

BRIEF DESCRIPTION OF THE DRAWINGS

FIG. 3 is a functional block diagram of the image processing device.
FIG. 4 illustrates an outline of processes by a three-dimensional reconstruction unit and a matching unit.

FIG. 12 illustrates a third display example of the inspector confirmation view.

FIG. 13 illustrates a fourth display example of the inspector confirmation view.

FIG. 14 illustrates a fifth display example of the inspector confirmation view.

EXAMPLE EMBODIMENTS

Hereinafter, an example embodiment of an image processing device, a control method, and a storage medium will be described with reference to the drawings.

First Example Embodiment (1) System Configuration

Figure 1:
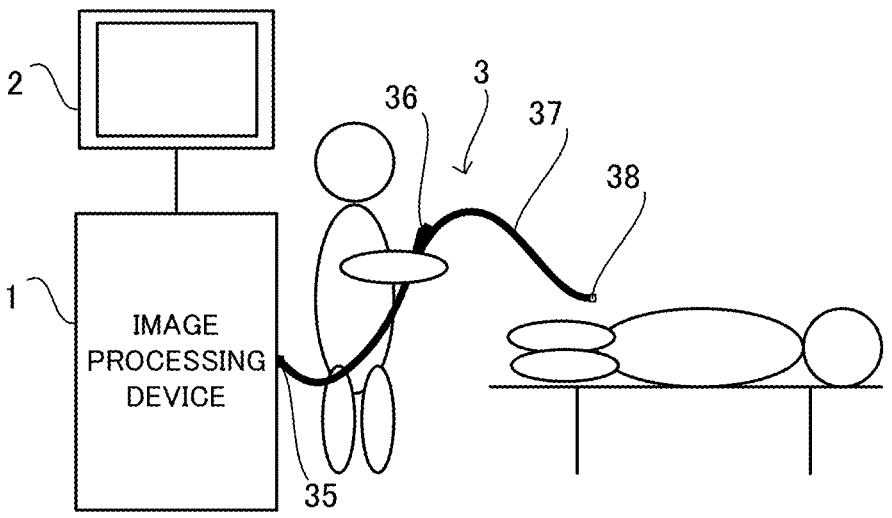
FIG. 1 illustrates a schematic configuration of an endoscopic inspection system.

FIG. 1 shows a schematic configuration of an endoscopic inspection system 100. As shown in FIG. 1, the endoscopic inspection system 100 mainly includes an image processing device 1, a display device 2, and an endoscope 3 connected to the image processing device 1. In the following, as a representative example, the process in which the endoscopic inspection target is a stomach will be explained.

The image processing device 1 acquires, from the endoscope 3, an image (also referred to as a "captured image Ic") photographed by the endoscope 3 in time series, and displays on the display device 2 a view (also referred to as "inspector confirmation view") based on the captured image Ic. The captured image Ic is an image acquired by photographing the stomach wall, that is a photographing target, of a subject at predetermined time intervals during the inspection. In the present example embodiment, the image processing device 1 generated data (also referred to as "reconstruction data Mr") acquired by reconstructing the three-dimensional shape of the subject's stomach from the captured images Ic, and performs matching it with a three-dimensional model (also referred to as "standard model Ms") of a standard stomach that is previously generated. Then, on the basis of the matching result, the image processing device 1 generates an image (also referred to as "photographed area indication image Im") that explicitly indicates, on the standard model Ms, the area photographed by the endoscope 3, thereby displaying the photographed area indication image Im on the display device 2. The photographed area indication image Im is an image which is acquired by converting a virtual inspection object and its photographed part in the three-dimensional space into information on the two-dimensional plane using a three-dimensional computer graphics and which therefore has a depth feeling (stereoscopic feeling).

The display device 2 is a display or the like for displaying information based on a display signal supplied from the image processing device 1.

The endoscope 3 is the device which photographs the lumen of the stomach by inserting it in the subject's stomach. The endoscope 3 mainly includes a connecting unit 35 for connecting with the image processing device 1, an operation unit 36 for the inspector to perform a predetermined input, a shaft 37 having flexibility and to be inserted into the lumen, and a pointed end unit 38 having a built-in photographing unit such as an ultra-small image pickup device.

(2) Hardware Configuration

Figure 2:
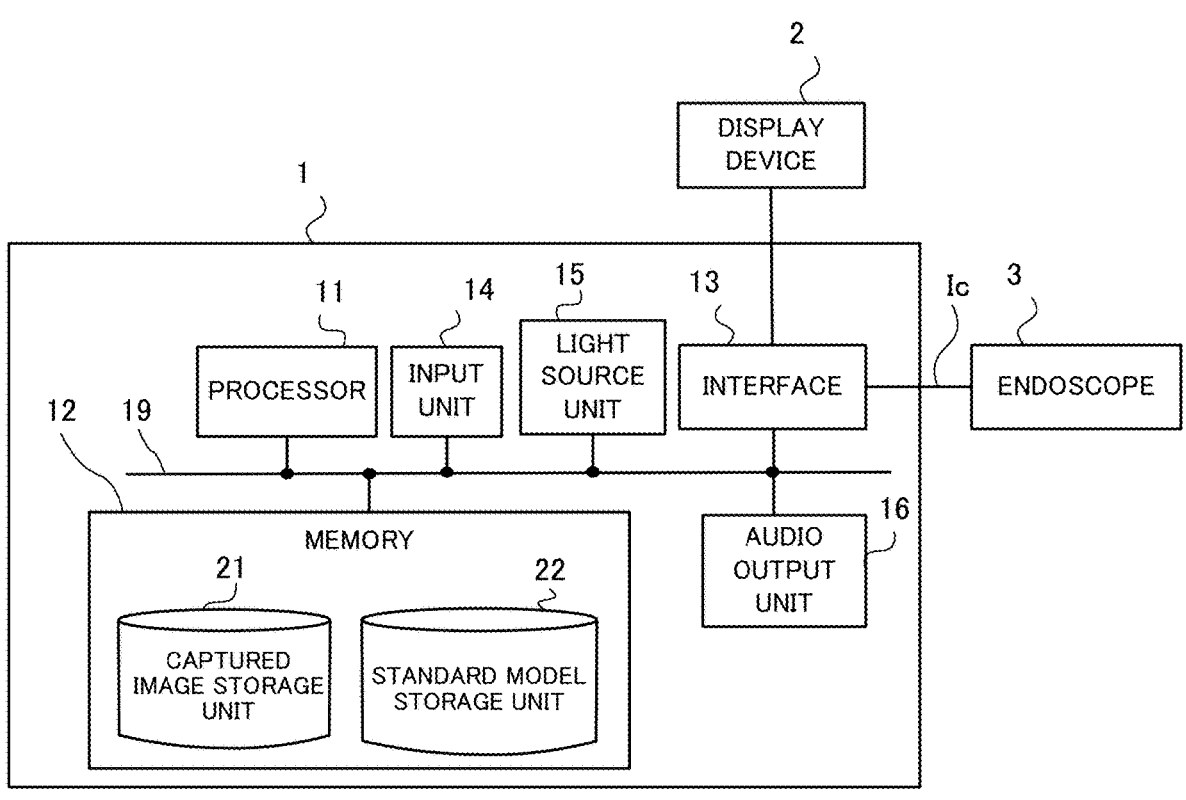
FIG. 2 illustrates a hardware configuration of an image processing device.

FIG. 2 shows the hardware configuration of the image processing device 1. The image processing device 1 mainly includes a processor 11, a memory 12, an interface 13, an input unit 14, a light source unit 15, and an audio output unit 16. Each of these elements is connected via a data bus 19.

The processor 11 executes a predetermined process by executing a program or the like stored in the memory 12. Examples of the processor 11 include a CPU (Central Process Unit), a GPU (Graphics Process Unit), and a quantum processor.

The memory 12 is configured by volatile memories, which is mainly used as working memories, and nonvolatile memories, which stores information necessary for process to be executed by the image processing device 1, such as a RAM (Random Access Memory) and a ROM (Read Only Memory). The memory 12 may include an external storage device such as a hard disk connected to or built in to the image processing device 1, or may include a storage medium such as a removable flash memory. The memory 12 stores a program for the image processing device 1 to execute each process in the present example embodiment. Further, the memory 12 functionally includes a captured image storage unit 21 and a standard model storage unit 22.

The captured image storage unit 21 stores a series of captured images Ic taken by the endoscope 3 in endoscopic inspection based on the control of the processor 11. These captured images Ic are used for generating the reconstruction data Mr. For example, each captured image Ic is stored in association with the identification information of the subject (e.g., patient ID), and the time stamp information and the like. The standard model storage unit 22 stores a standard model Ms that is previously generated using CT images or the like targeting plural subjects. An approach for generating standard model information will be described later with reference to FIG. 5. At least one of the captured image storage unit 21 and the standard model storage unit 22 may be provided in an external device capable of data communication with the image processing device 1 by wired or wirelessly in place of the memory 12. The external device may be one or more server devices capable of data communication through the communication network with the image processing device 1.

The interface 13 performs an interface operation between the image processing device 1 and an external device. For example, the interface 13 supplies the display information "Id" generated by the processor 11 to the display device 2. Further, the interface 13 supplies the light generated by the light source unit 15 to the endoscope 3. The interface 13 also provides an electrical signal to the processor 11 indicative of the captured image Ic supplied from the endoscope 3. The interface 13 may be a communication interface, such as a network adapter, for wired or wireless communication with an external device, or a hardware interface conforming to a USB (Universal Serial Bus), a SATA (Serial AT Attachment), and the like.

The input unit 14 generates an input signal based on the operation by the inspector. Examples of the input unit 14 include a button, a touch panel, a remote controller, and a voice input device. The light source unit 15 generates light for supplying to the pointed end unit 38 of the endoscope 3. The light source unit 15 may also incorporate a pump or the like for delivering water and air to be supplied to the endoscope 3. The audio output unit 16 outputs a sound under the control of the processor 11.

(3) Functional Block

Figure 3:
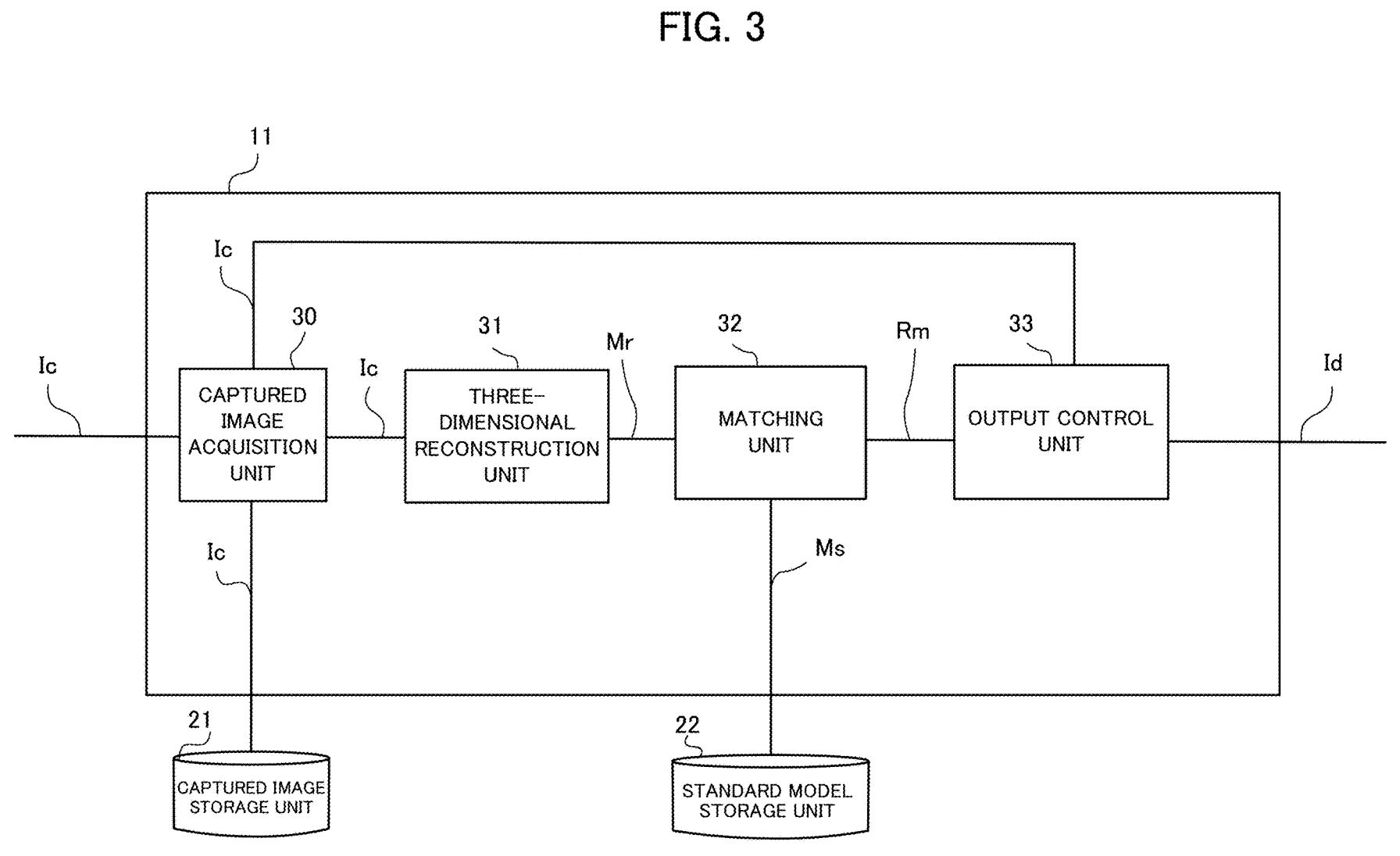

FIG. 3 is a functional block diagram of the image processing device 1. As shown in FIG. 3, the processor 11 of the image processing device 1 functionally includes a captured image acquisition unit 30, a three-dimensional reconstruction unit 31, a matching unit 32, and an output control unit 33.

The captured image acquisition unit 30 acquires the captured image Ic taken by the endoscope 3 via the interface 13 at predetermined intervals. Then, the captured image acquisition unit 30 supplies the acquired captured image Ic to the three-dimensional reconstruction unit 31. The captured image acquisition unit 30 stores the acquired captured image Ic in the captured image storage unit 21 in association with the time stamp, the patient ID, and the like.

The three-dimensional reconstruction unit 31 generates the reconstruction data Mr indicating the three-dimensional shape of the photographed stomach, based on a plurality of captured images Ic captured by the captured image acquisition unit 30 during the endoscopic inspection. For example, the reconstruction data Mr includes a point cloud data having three-dimensional position information.

In this case, for example, after acquiring a number of captured images Ic necessary for generating the reconstruction data Mr, the three-dimensional reconstruction unit 31 generates the reconstruction data Mr by using a method of identifying the three-dimensional shape of the subject and relative position of the photographing unit based on a plurality of images. As such a method, there are methods such as Structure from Motion (SfM). Thereafter, for example, the three-dimensional reconstruction unit 31 updates the generated reconstruction data Mr each time it acquires a predetermined number of captured images Ic. The predetermined number may be one or more, and for example, it is predetermined to a value in consideration of the process capacity of the image processing device 1. Then, the three-dimensional reconstruction unit 31 supplies the generated (including "updated") reconstruction data Mr to the matching unit 32. A method of generating the reconstruction data Mr will be described later.

The matching unit 32 performs matching between the reconstruction data Mr supplied from the three-dimensional reconstruction unit 31 and the standard model Ms stored in the standard model storage unit 22, and supplies the matching result "Rm" that is the result of the matching to the output control unit 33. In this case, the matching unit 32 performs a non-rigid registration (alignment), and generates the matching result Rm that is data representing the reconstruction data Mr and the standard model Ms after the non-rigid registration expressed in a common three-dimensional coordinate system.

The output control unit 33 generates a photographed area indication image Im based on the matching result Rm generated by the matching unit 32, wherein the photographed area indication image Im indicates an image in which the reconstruction data Mr and the standard model Ms after the registration (alignment) expressed on the three-dimensional coordinates are projected on a predetermined two-dimensional coordinate system. Then, the output control unit 33 generates display information Id for displaying the inspector confirmation view in which the photographed area indication image Im is aligned with the latest photographed image Ic acquired by the photographed image acquisition unit 30, and supplies the generated display information Id to the display device 2. Further, the output control unit 33 outputs information for providing a guidance or an attention (warning) relating to the photographing of the endoscope 3 for the inspector. The output of this information may be performed on the inspector confirmation view or may be performed by the audio output unit 16. A specific process by the output control unit 33 will be described later.

Figure 4:
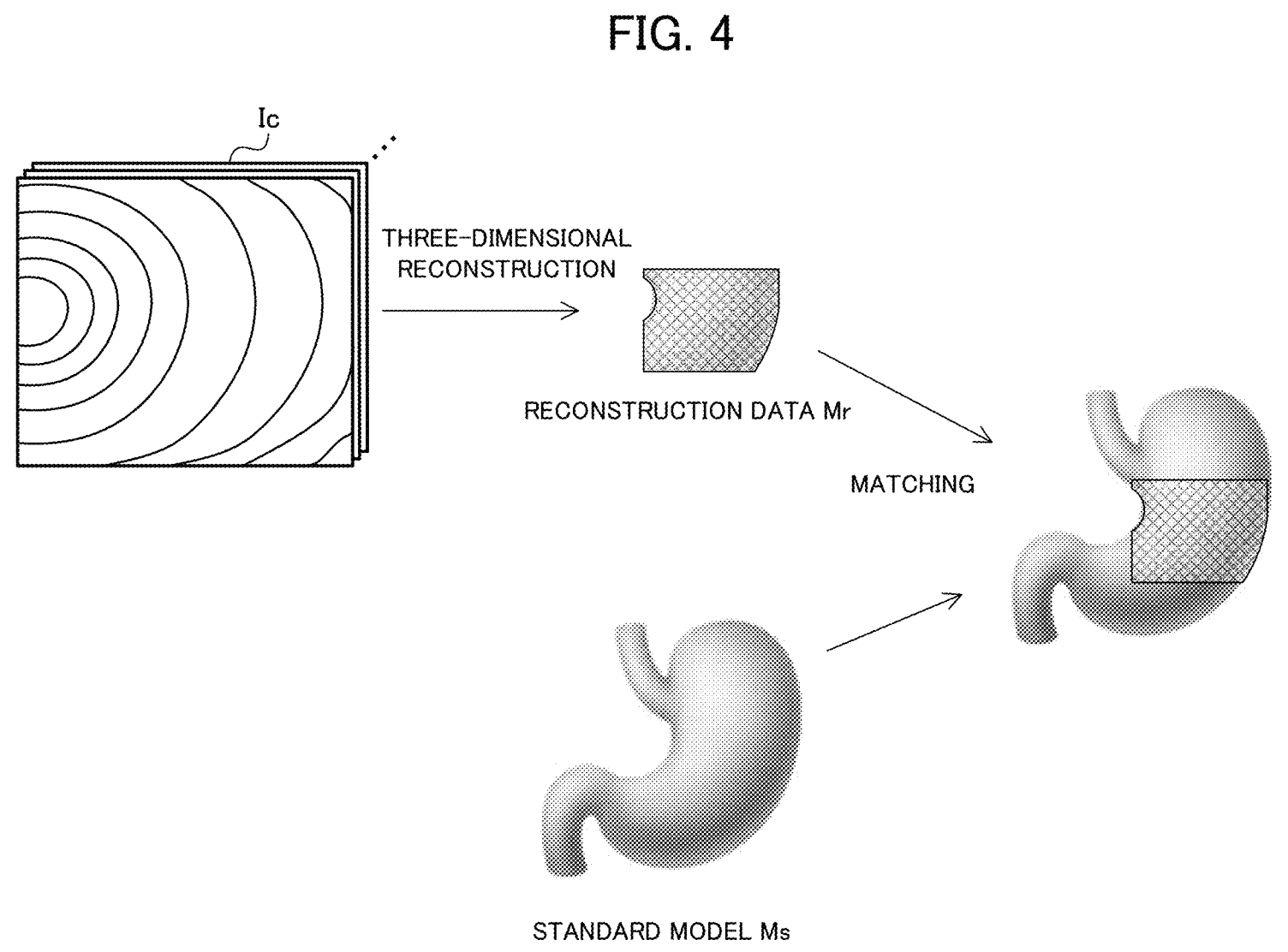

FIG. 4 shows an outline of the process by the three-dimensional reconstruction unit 31 and the matching unit 32. As shown in FIG. 4, the three-dimensional reconstruction unit 31 generates the reconstruction data Mr corresponding to the three-dimensional shape of the photographed area, based on a plurality of captured images Ic acquired so far during the ongoing endoscopic inspection. Then, the matching unit 32 performs matching (non-rigid registration) between the standard model Ms configured by referring to the standard model storage unit 22 and the reconstruction data Mr. Thereby, the matching unit 32 generates a matching result Rm in which the standard model Ms representing the entire stomach and the reconstruction data Mr corresponding to the photographed area are associated in the three-dimensional space. On the basis of such a matching result Rm, the output control unit 33 can suitably generate a photographed area indication image Im.

Each component described in FIGS. 3 and 4 such as the captured image acquisition unit 30, the three-dimensional reconstruction unit 31, the matching unit 32, and the output control unit 33 can be realized, for example, by the processor 11 executing a program. More specifically, each component may be implemented by the processor 11 executing a program stored in the memory 12. In addition, the necessary program may be recorded in any non-volatile storage medium and installed as necessary to realize the respective components. Each of these components is not limited to being implemented by software by a program, and may be implemented by any combination of hardware, firmware, and software. Each of these components may also be implemented using user programmable integrated circuit, such as, for example, a FPGA (field-programmable gate array) or a microcomputer. In this case, the integrated circuit may be used to realize a program including the above-described components. Thus, each component may be implemented by any computer (controller) including hardware other than the processor. The above is true in other example embodiments to be described later.

(4) Process Flow

Next, a description will be given of the process flow in the first example embodiment.

(4-1) Overview

Figure 5:
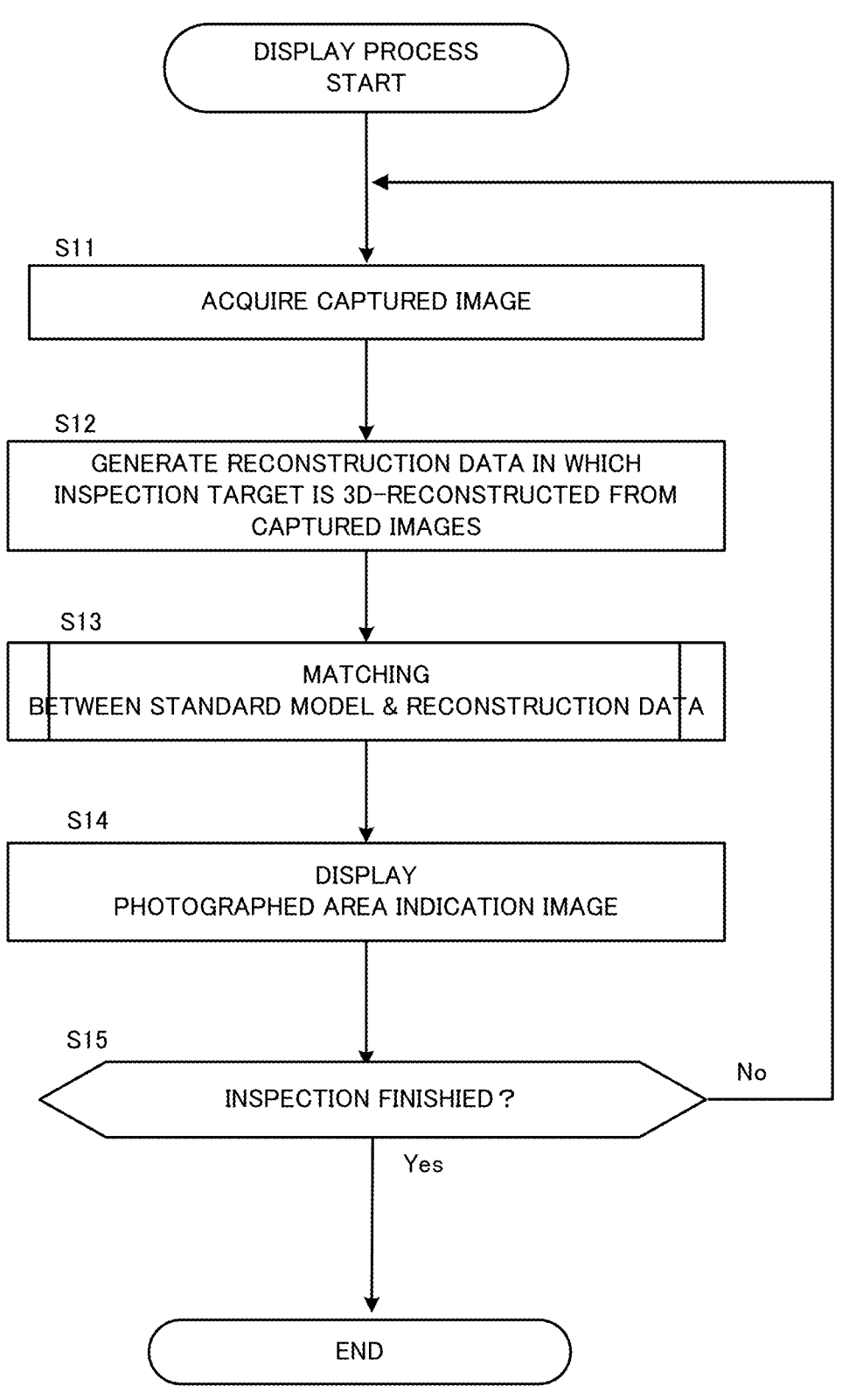
FIG. 5 illustrates an example of a flowchart showing an outline of a display process performed by the image processing device during endoscopic inspection according to the first example embodiment.

FIG. 5 is an example of a flowchart showing an outline of a display process performed by the image processing device 1 during the endoscopic inspection in the first example embodiment.

First, the image processing device 1 acquires the captured image Ic (step S11). In this case, the captured image acquisition unit 30 of the image processing device 1 receives the captured image Ic from the endoscope 3 via the interface 13.

Next, the image processing device 1 generates reconstruction data Mr in which the inspection target is three-dimensionally reconstructed from a plurality of captured images Ic acquired at step S11 (step S12). In this case, on the basis of the captured images Ic acquired during the time period from the inspection start time to the current processing time, the three-dimensional reconstruction unit 31 of the image processing device 1 generates the reconstruction data Mr corresponding to the photographed area using a technique such as SfM.

Next, the image processing device 1 performs matching between the standard model Ms and the reconstruction data Mr (step S13). In this case, the matching unit 32 of the image processing device 1 performs non-rigid registration between the standard model Ms acquired from the standard model storage unit 22 and the reconstruction data Mr generated by the three-dimensional reconstruction unit 31, thereby generating the matching result Rm. The process at step S13 will be described in detail with reference to FIG. 7.

Then, the image processing device 1 displays the photographed area indication image Im on the display device 2 (step S14). In this case, the output control unit 33 of the image processing device 1 generates the display information Id for displaying the inspector confirmation view in which the photographed area indication image Im and the latest photographed image Ic are arranged side by side, as will be described later, and supplies the display information Id to the display device 2. Further, the output control unit 33 performs a predetermined output for informing the inspector of the presence of a zone (partical area) with an insufficient photographed duration in the photographed area of the stomach to be inspected, or displays information indicating the direction to move the endoscope 3 or the location to be photographed or the like on the inspector confirmation view.

Next, the image processing device 1 determines whether or not the endoscopic inspection has been finished (Step S15). For example, the image processing device 1 determines that the endoscopic inspection has been finished when a predetermined input or the like through the input unit 14 or the operation unit 36 is detected. Then, if the image processing device 1 determines that the endoscopic inspection has been finished (step S15; Yes), it ends the process of the flowchart. On the other hand, if the image processing device 1 determines that the endoscopic inspection has not been finished (Step S15; No), the image processing device 1 returns the process to step S11. Then, at step S11, the image processing device 1 acquires the captured image Ic newly generated by the endoscope 3 and uses the captured image Ic as the process target for re-executing the process at step S12 to step S15.

(4-2) Standard Model Generation Process

Figure 6:
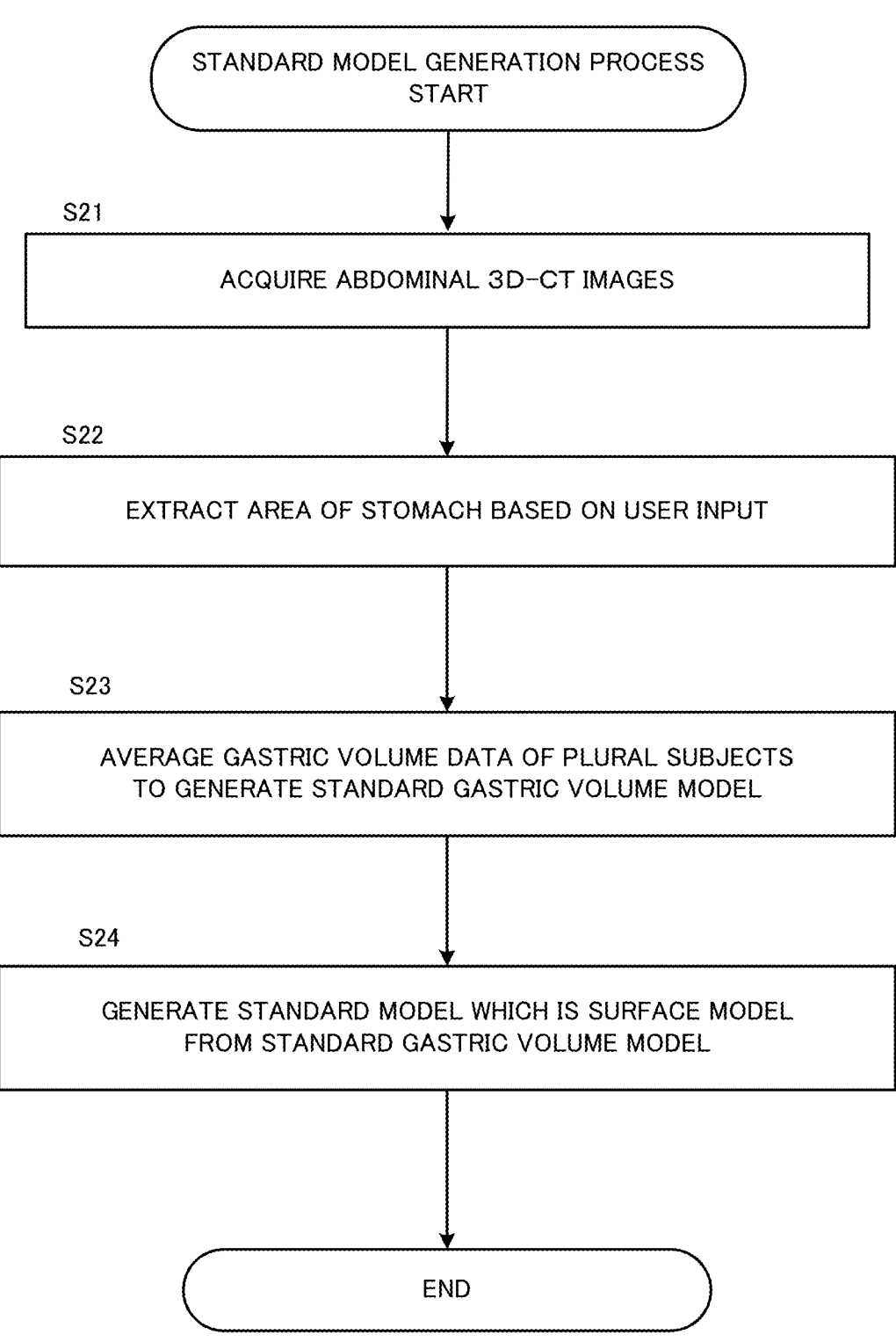
FIG. 6 illustrates an example of a flowchart showing the procedure of the standard model generation process.

FIG. 6 is a flowchart illustrating an example of the generation process of the standard model Ms stored in the standard model storage unit 22. Hereinafter, for convenience of explanation, the image processing device 1 will be described as the executer of the process, but any device other than the image processing device 1 may be the executer of the process. In that case, after the standard model Ms is generated by any device, the generated standard model Ms is stored in the memory 12 via a data communication or removable storage medium or the like.

First, the image processing device 1 acquires 3D-CT images acquired by photographing the abdomen (step S21). Then, the image processing device 1 extracts the area of the stomach from each of the 3D-CT images based on the user input (Step S22). In this case, the image processing device 1 displays each of the 3D-CT images on the display device 2 and receives the user input specifying the area of the stomach by the input unit 14. Then, the image processing device 1 performs the process at step S21 and step S22 on 3D-CT images of plural subjects, and extracts the areas of the stomachs of the plural subjects.

Next, the image processing device 1 averages the gastric volume data representing the areas of the stomachs extracted from 3D-CT images of the plural subjects, and generates a three-dimensional standard gastric volume model (Step S23). The gastric volume data is, for example, three-dimensional voxel data in which the area of the stomach is represented by binary, 0 and 1. At step S23, the image processing device 1, after performing the registration (alignment) of the gastric volume data of the plural subjects based on the user input, generates a three-dimensional standard gastric volume model by arithmetic averaging of the gastric volume data after the registration.

Next, the image processing device 1 generates a three-dimensional standard model Ms, which is a surface model, from the three-dimensional standard gastric volume model generated at step S23 (step S24). In this case, the image processing device 1 converts the standard gastric volume model into the standard model Ms using any algorithm that converts voxel data into polygon data. Examples of the above algorithm include marching cubes and the marching tetrahedra Algorithm. After step S24, the generated standard model Ms is stored in a memory 12 that can be referred to by the image processing device 1.

(4-3) Matching Process

Figure 7:
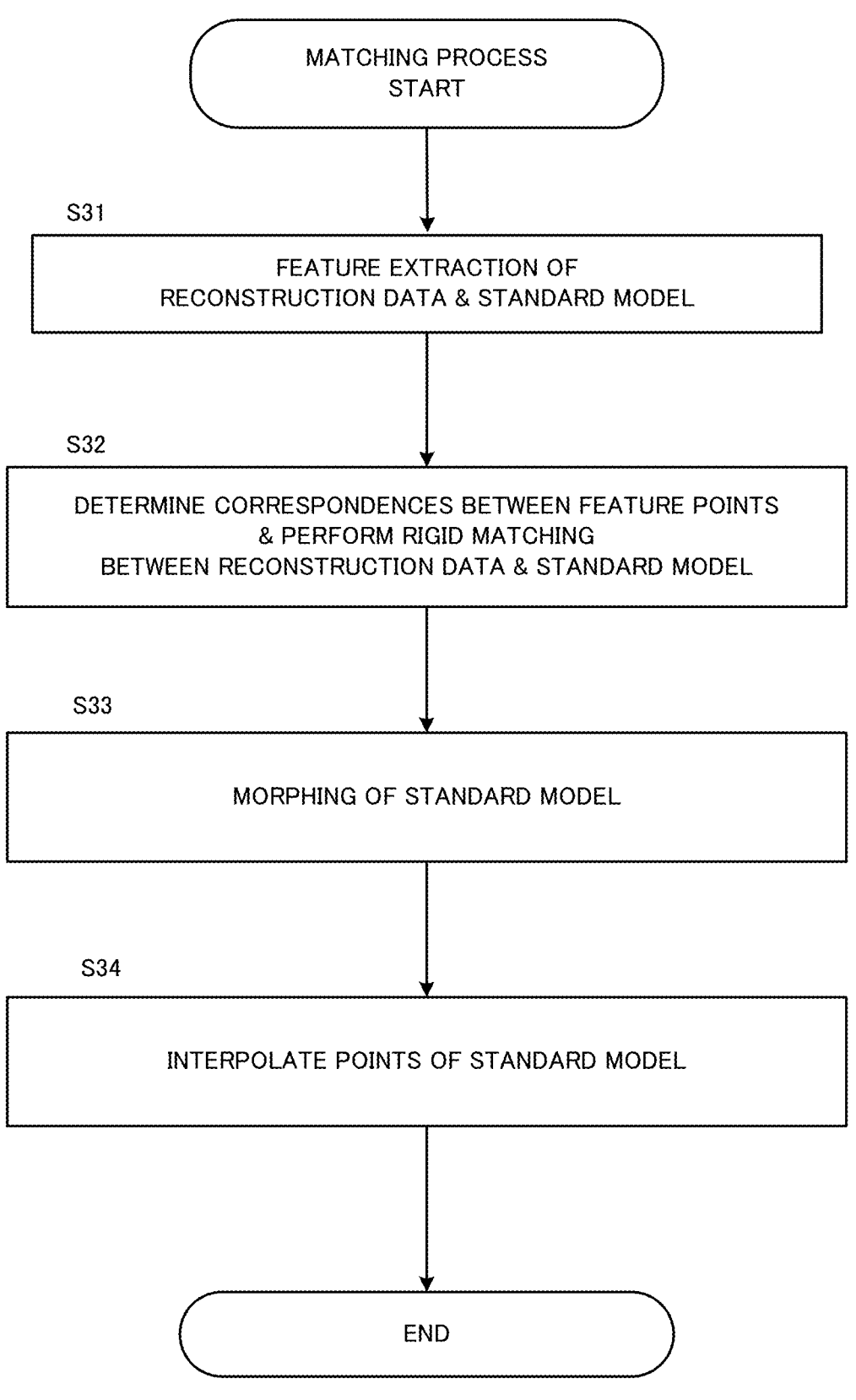
FIG. 7 illustrates an example of a flowchart showing the procedure of the matching process.

FIG. 7 is an example of a flowchart showing the procedure of the matching process between the standard model Ms and the reconstruction data Mr to be executed at step S13.

First, the matching unit 32 extracts, from the standard model Ms and the reconstruction data Mr, respectively, feature points serving as landmarks (step S31). The feature point extraction process of the reconstruction data Mr will be described later with reference to FIGS. 8 and 9. A predetermined identification label for each feature point to be extracted may be added to the standard model Ms.

Then, the matching unit 32 determines correspondences between the feature points extracted from the standard model Ms and the feature points extracted from reconstruction data Mr, respectively, thereby to perform a rigid matching (rigid registration) between the standard model Ms and the reconstruction data Mr (step S32). In this case, the matching unit 32 translates (including rotate) at least one of the standard model Ms or the reconstruction data Mr so that the distance between the corresponding feature points is minimized.

Next, the matching unit 32 performs morphing of the standard model Ms with reference to the reconstruction data Mr (step S33). In this case, by using a matching method of point clouds such as ICPD (Iterative Coherent Point Drift), the matching unit 32 performs matching between the standard model Ms and the reconstruction data Mr thereafter to move the points in the standard model Ms other than the points determined to be the feature points (landmarks).

Furthermore, the matching unit 32 interpolates the points of the standard model Ms (step S34). In this case, the matching unit 32 interpolates the points of the standard model Ms after the morphing, for example, by performing the projection of the vertices using Laplace-Beltrami operator.

Figure 8:
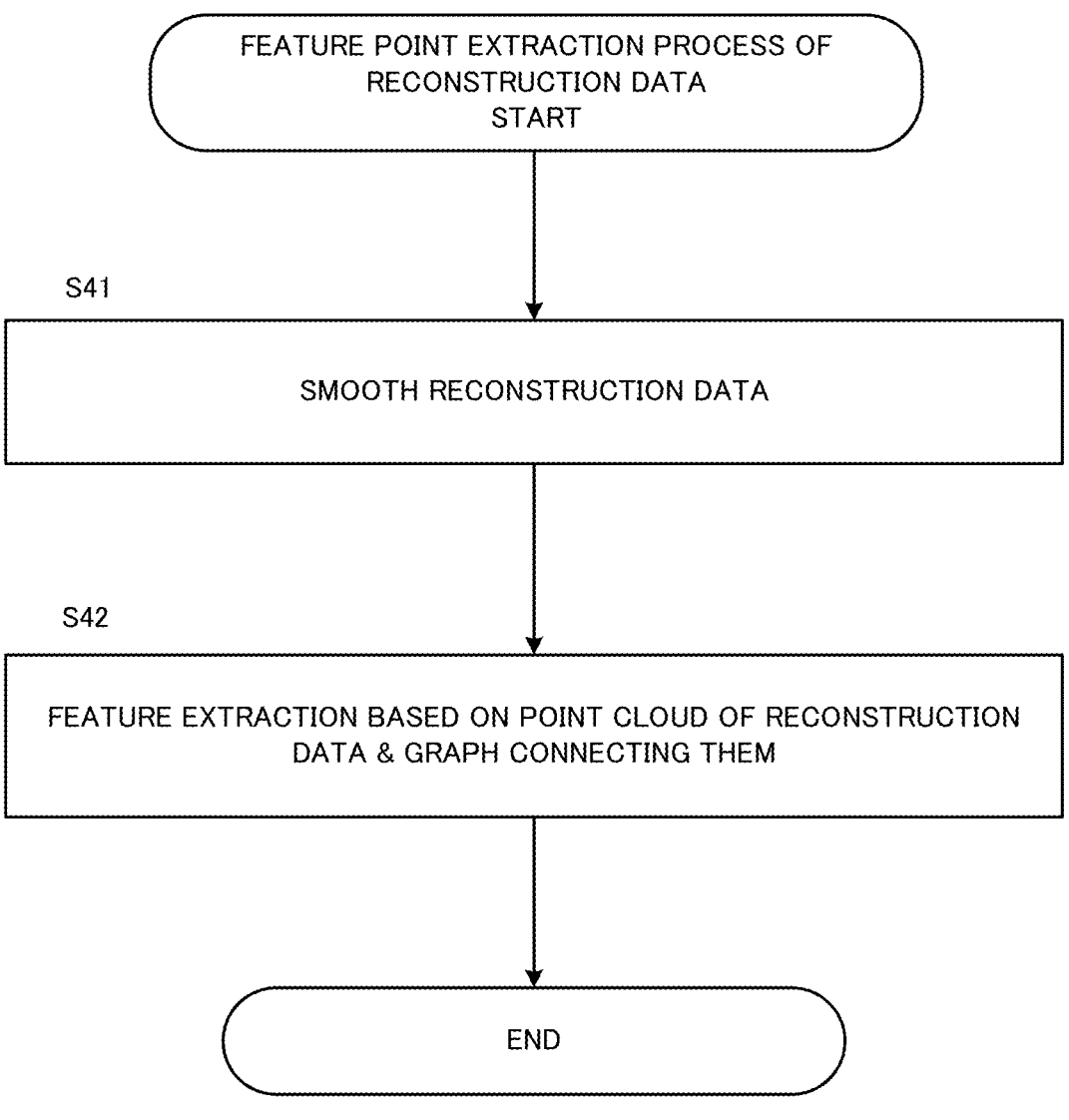
FIG. 8 illustrates an example of a flowchart showing the procedure of the feature extraction process of the reconstruction data.

FIG. 8 is an example of a flowchart showing the procedure of the feature extraction process of the reconstruction data Mr executed at step S31 in FIG. 7.

First, the matching unit 32 performs smoothing in three dimensions of the reconstruction data Mr which indicates the three-dimensional shape and which is generated by the three-dimensional reconstruction unit 31 (step S41). The smoothing in three dimensions will be described later.

Next, on the basis of the point cloud of the smoothed reconstruction data Mr and the graph connecting them, the matching unit 32 extracts feature points that are characteristic in the point cloud (step S42). In this case, the matching unit 32 performs extraction of the above-described feature points of the point cloud by using various point cloud feature extraction techniques such as, for example, principal component analysis (PCA: Principal Component Analysis) and DoCoG (Difference of Center of Gravity).

Next, a description will be given of the three-dimensional smoothing at step S41 with reference to FIGS. 9A to 9C.

Figure 9A:
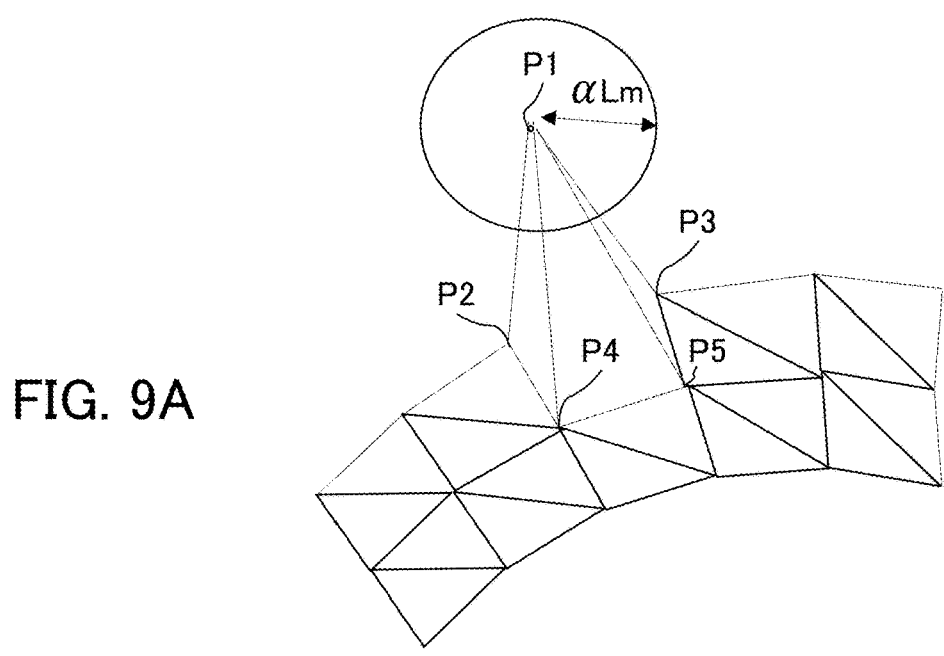
FIG. 9A is an enlarged view of a part of the reconstruction data.
Figure 9B:
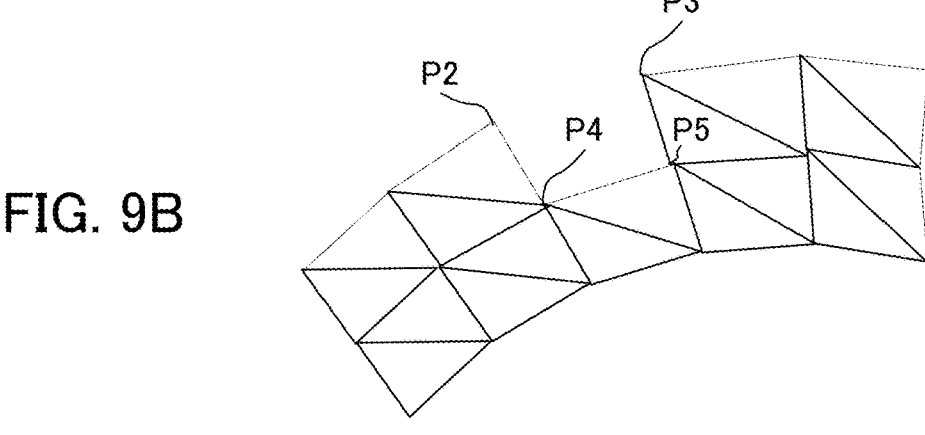
FIG. 9B is an enlarged view of a part of the reconstruction data after the isolated point removal.
Figure 9C:
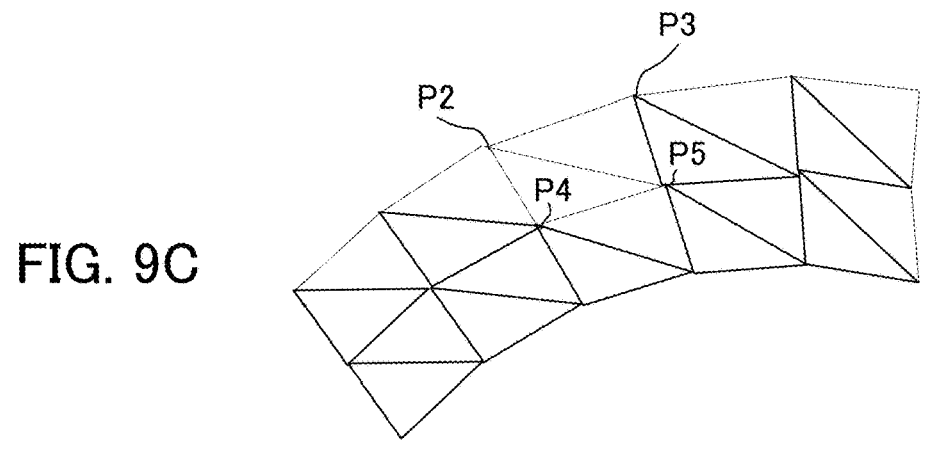
FIG. 9C is an enlarged view of a part of the reconstruction data after applying the Delaunay triangulation.

FIG. 9A is an enlarged view of a part of the reconstruction data Mr generated by the three-dimensional reconstruction unit 31. As shown in FIG. 9A, the reconstruction data Mr generated by the three-dimensional reconstruction unit 31 has an isolated vertex "P1" apart from other connected vertices. FIG. 9B shows the state of a part of the reconstruction data Mr after removing the vertex P1 as an isolated point.

In this case, first, with respect to the vertices constituting the reconstruction data Mr, the matching unit 32 calculates the average value "Lm" of the distance between two vertices that are connected. In this case, the matching unit 32, instead of calculating the average value of the distance between each of all vertices and each of all connected vertices thereto as the average value Lm, may calculate the average value of the distance between each of some vertices and each of all or a predetermined number of vertices connected thereto as the average value Lm.

Next, for each vertex constituting the reconstruction data Mr, the matching unit 32 calculates the number (also referred to as "the number of neighboring other vertices") of other connected vertices within the distance ($\alpha$Lm) that is the calculated average value Lm multiplied by "$\alpha$". Then, the matching unit 32 identifies, as an isolated point, such a vertex that the number of neighboring other vertices is less than a threshold number, and removes the isolated point. The coefficient $\alpha$ and the threshold number described above are, for example, fit values stored in advance in the memory 12 or the like. In the example of FIG. 9A, the distance between the vertex P1 and each of other vertices P2 to P5 connected to the vertex P1 is longer than the distance $\alpha$Lm, and therefore the number of neighboring other vertices is less than the threshold value. Thus, the matching unit 32 identifies the vertex P1 as an isolated point. Then, the matching unit 32, as shown in FIG. 9B, removes the vertex P1 identified as an isolated point.

The matching unit 32 then applies the Delaunay triangulation to the vertices connected to the removed vertices. FIG. 9C shows the state of a part of the reconstruction data Mr after applying the Delaunay triangulation. In FIG. 9C, the matching unit 32 applies the Delaunay triangulation to the vertices P2 to P5 connected to the removed vertex P1 thereby to newly connect the vertex P2 and the vertex P5. Thus, the matching unit 32 can remove an isolated point while suitably smoothing the reconstruction data Mr that is the three-dimensional shape.

(5) Inspector Confirmation View

Next, the inspector confirmation view which the output control unit 33 displays on the display device 2 will be described in detail. The output control unit 33 generates the display information Id for displaying an inspector confirmation view in which the photographed area indication image Im and the latest photographed image Ic are arranged side by side, and then supplies the display information Id to the display device 2, to thereby display the inspector confirmation view described above on the display device 2. Further, the output control unit 33 performs control to notify the inspector of the presence of a zone in which the photographed duration is short in the photographed area, or to provide a guidance of the direction to move the endoscope 3 and/or the location to be photographed.

Figure 10:
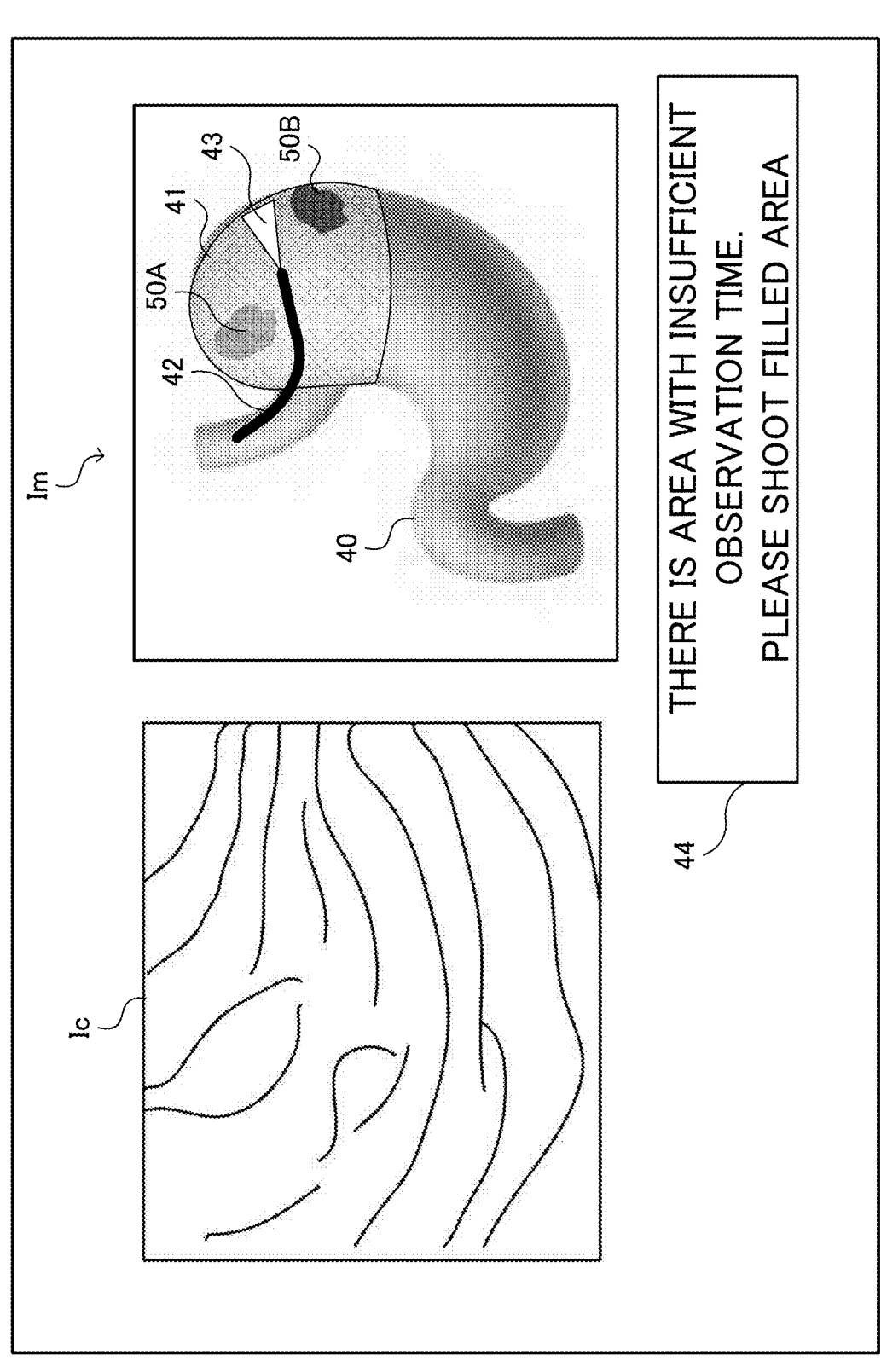
FIG. 10 illustrates a first display example of an inspector confirmation view.

FIG. 10 shows a first display example of the inspector confirmation view. In the first display example, the output control unit 33 changes the display appearance within the photographed area on the photographed area indication image Im, based on the difference in the photographed duration within the photographed area. Further, the output control unit 33 outputs an attention to the photographed zone (subarea) in which the photographed duration is smaller than a threshold value.

In FIG. 10, the output control unit 33 displays, on the inspector confirmation view, the latest captured image Ic captured by the endoscope 3, a photographed area indication image Im that indicates a photographed area captured by the endoscope 3 during the inspection, and a notification window 44 for displaying the notification content to the inspector.

Here, the output control unit 33 displays the projection standard model 40, which is the standard model Ms projected onto the two-dimensional coordinates after the matching, on the photographed area indication image Im. Then, the output control unit 33 superimposes and displays the photographed projection area 41 on the projection standard model 40, wherein the photographed projection area 41 is the reconstruction data Mr projected onto the above-mentioned two-dimensional coordinates after matching. Here, the photographed projection area 41 has a predetermined transmittance so that the projection standard model 40 subjected to the superposition can be seen. Furthermore, the output control unit 33 superimposes, on the projection standard model 40 in the photographed area indication image Im, an endoscope icon 42 schematically representing a part of the endoscope 3, and a photographing area icon 43 schematically representing the current photographing range of the endoscope 3. In this case, the output control unit 33 estimates the position and the photographing area of the endoscope 3 in the standard model Ms, based on the relative position and the posture of the photographing unit of the endoscope 3 acquired as the execution result of the SfM executed at the time of generation of the reconstruction data Mr. Then, the output control unit 33 displays the endoscope icon 42 and the photographing area icon 43 based on the estimation result.

The output control unit 33 may receive an input for moving the viewpoint position for projecting the standard model Ms and the reconstruction data Mr, on the basis of a touch operation on the photographed area indication image Im by the user. In this case, the output control unit 33 regenerates the photographed area indication image Im by projecting the reconstruction data Mr and the standard model Ms and the like to the two-dimensional coordinates from the viewpoint position specified by the input, and re-displays the photographed area indication image Im on the display device 2. Thereby, the output control unit 33 can allow the inspector to confirm the photographed area from arbitrary viewpoints of observing the target stomach of the inspection.

Furthermore, the output control unit 33 divides the photographed projection area 41 based on the photographed duration, and performs a color-coded display of the divided areas. In the example of FIG. 10, the output control unit 33 divides the photographed projection area 41 into: a first zone 50A where the photographed duration is less than a first threshold value and equal to or larger than a second threshold value; a second zone 50B where the photographed duration is less than the second threshold value; and the other area. Then, the output control unit 33 displays the color (including shading or transmittance)-coded divided areas.

Here, the first threshold and the second threshold are two-stage thresholds for determining whether or not the photographed duration is sufficient, and the first threshold is set to a value larger than the second threshold. In this case, for example, the output control unit 33 counts, for each plane (or vertex or feature point) of the reconstruction data Mr, the number of corresponding captured images Ic among the captured images Ic used for generating the reconstruction data Mr, and estimates the photographed duration according to the counted number of the corresponding captured images Ic for each plane of the reconstruction data Mr. Thereafter, the output control unit 33 divides the photographed projection area 41 based on the first threshold and the second threshold described above.

Then, the output control unit 33 determines that the first zone 50A, whose photographed duration is less than the first threshold value and equal to or larger than the second threshold value, is a zone with a slightly insufficient photographed duration. Thus, the output control unit 33 displays the first zone 50A filled by a relatively thin or inconspicuous color. On the other hand, the output control unit 33 determines that the second zone 50B, whose photographed duration is less than the second threshold, is a zone with a seriously insufficient photographed duration. Thus, the output control unit 33 displays the second zone 50B filled with a relatively dark or conspicuous color. Further, the output control unit 33 displays the other area in the photographed projection area 41 other than the first zone 50A and the second zone 50B by a color that is less conspicuous (or higher transmittance) than the first zone 50A and the second zone 50B.

Furthermore, in order to notify the inspector of the presence of the first zone 50A and the second zone 50B with insufficient photographed durations, the output control unit 33 displays in notification window 44 the textual information that "THERE IS AREA WITH INSUFFICIENT OBSERVATION TIME. PLEASE SHOOT FILLED AREA". Thereby, the output control unit 33 enables the inspector to suitably recognize the presence of a zone with an insufficient photographed duration in the photographed area and can urges the inspector to re-photograph the zone to inspector.

The output control unit 33 according to the first display example may notify the inspector of the presence of the zone with the insufficient photographed duration by voice or warning sound instead of, or in addition to, using the notification window 44. In this case, the output control unit 33 supplies audio output information for outputting a predetermined voice or warning sound to the audio output unit 16.

Further, the mode to change the appearance within the photographed projection area 41 on the photographed area indication image Im depending on the difference in the photographed duration within the photographed projection area 41 is not limited to the mode shown in FIG. 10. For example, the output control unit 33 may continuously change the shading or color within the photographed projection area 41, like a heat map, according to the photographed duration. In another example, the output control unit 33 may use, instead of using the first threshold and the second threshold, one or more than two thresholds to differentiate the display appearance of divided areas in the photographed projection area 41 depending on the relation between the photographed duration thereof and the threshold(s).

Figure 11:
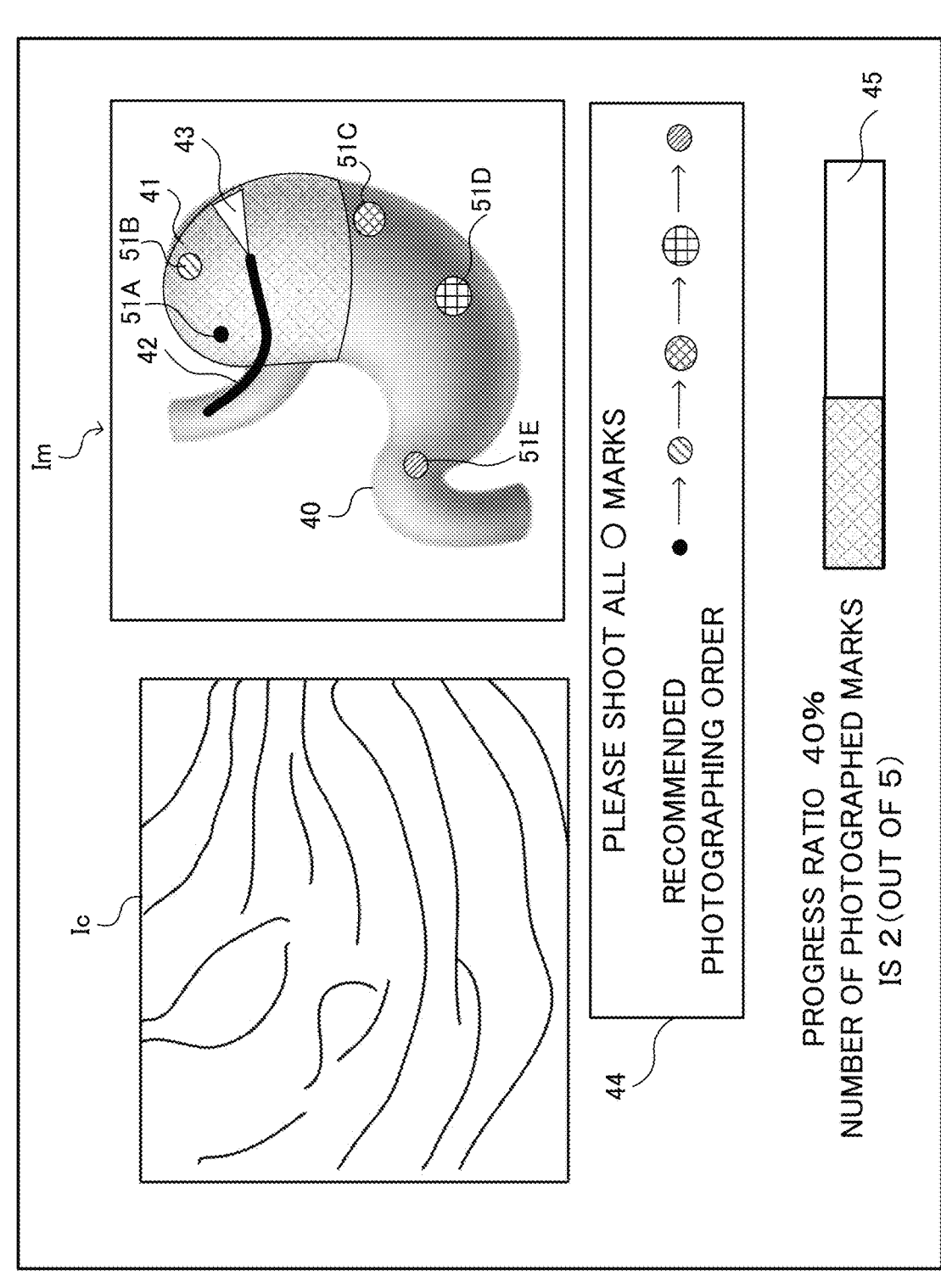
FIG. 11 illustrates a second display example of the inspector confirmation view.

FIG. 11 shows a second display example of the inspector confirmation view. In the second display example, the output control unit 33 explicitly indicates, as the guidance information relating to the movement of the endoscope 3, the information relating to a part (also referred to as "photographing necessary part") necessary to be photographed in the endoscopic inspection on the photographed area indication image Im.

In FIG. 11, the output control unit 33 displays the captured image Ic, the photographed area indication image Im, the notification window 44, and a progress ratio gauge 45 on the inspector confirmation view. The output control unit 33 displays the projection standard model 40, the photographed projection area 41, the endoscope icon 42, and the photographing area icon 43 in the photographed area indication image Im in the same manner as the first display example shown in FIG. 10.

In the second display example, the output control unit 33 explicitly indicates marks 51A to 51E each indicating the position of the photographing necessary part on the projection standard model 40 in the photographing area indication image Im. Here, the output control unit 33, as an example, determines the size of each of the marks 51A to 51E according to the size of the corresponding photographing necessary part. The information on the position and size of the photographing necessary part with reference to the standard model Ms is stored in advance in the memory 12 or the like, for example. In such a case that the stomach is the inspection target, examples of the photographing necessary parts include (A) the posterior wall/anterior wall/lesser curvature of the upper part of the stomach, (B) the posterior wall/greater curvature/anterior wall/lesser curvature of the middle part of the stomach, (C) the posterior wall/greater curvature/anterior wall/lesser curvature of the lower part of the stomach, (D) the corner lesser curvature/greater curvature, (E) the fornix, (F) the antrum, (G) the lesser curvature/posterior wall/anterior wall, (H) the lesser curvature of the cardia, and (I) the pyloric area.

Further, the output control unit 33 shows, in the notification window 44, textual information, which indicates that the photographing necessary parts indicated by the marks 51A to 51E should be photographed, and their recommended photographing order. Information relating to the recommended photographing order of the photographing necessary parts, for example, is stored in advance in the memory 12 or the like.

Furthermore, the output control unit 33 indicates, by the progress ratio gauge 45, the progress ratio indicating the ratio (percentage) of the photographing necessary parts already photographed by the endoscope 3 to all the photographing necessary parts. In the example of FIG. 11, the output control unit 33 displays the progress ratio gauge 45, which indicates the progress ratio is 40%, for there are five photographing necessary parts and the two photographing necessary parts out of five overlap with the reconstruction data Mr.

As described above, in the second display example, the output control unit 33 explicitly indicates the photographing necessary part on the photographing area indication image Im. Thereby, the inspector can comprehensively grasp the photographing necessary part while suitably comparing the current photographing position with the photographed area. Further, the output control unit 33, displays the recommended photographing order of the photographing necessary parts, thereby allowing the inspector to smoothly execute the inspection. Further, the output control unit 33 displays the progress ratio gauge 45, thereby allowing the inspector to easily grasp the progress based on the photographing necessary parts. The output control unit 33 may determine the progress ratio based on the ratio of the area of the already-photographed stomach wall (i.e., the degree of overlap between the standard model Ms and the reconstruction data Mr) instead of determining the progress ratio based on the ratio of the already-photographed photographing necessary parts.

Figure 12:
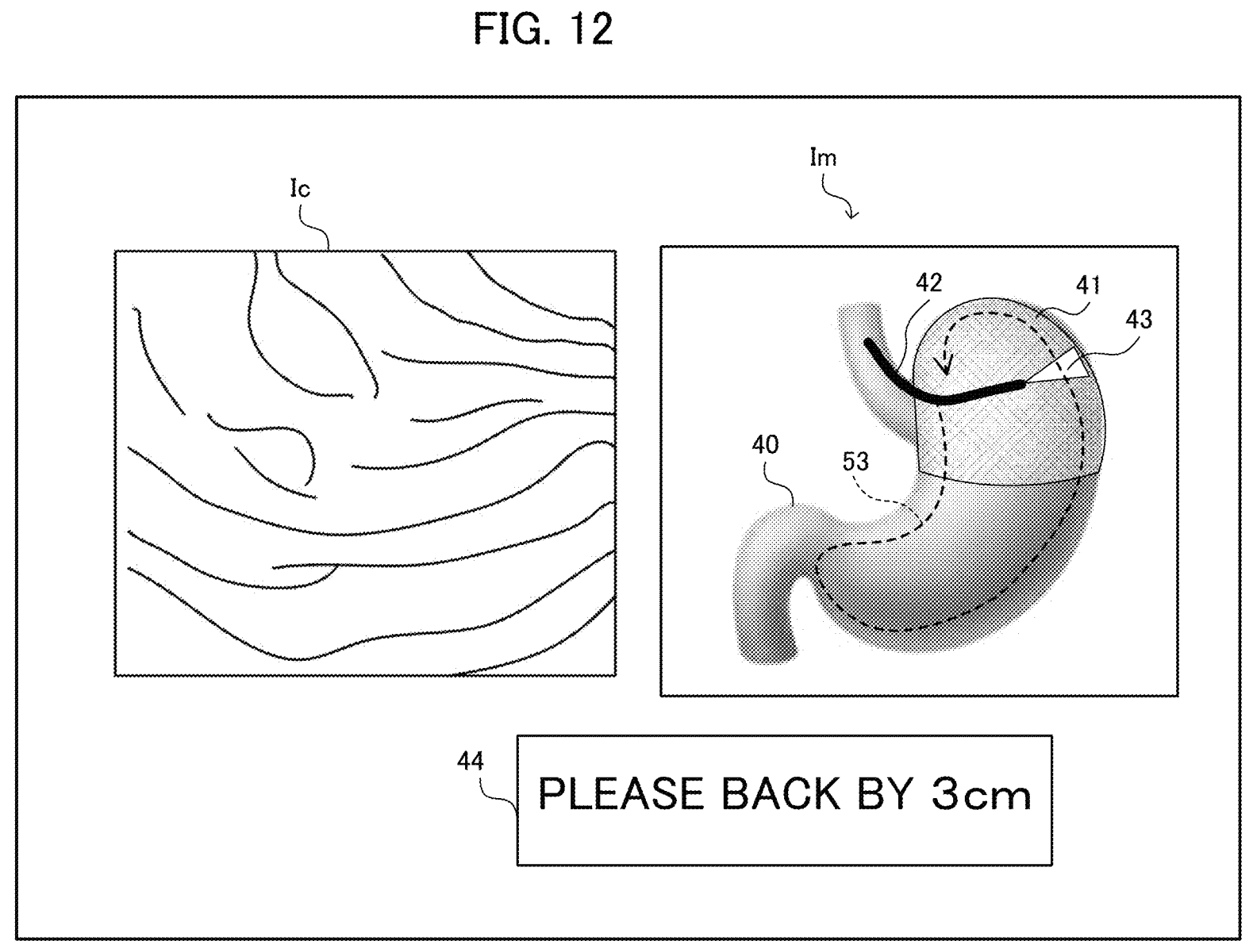

FIG. 12 shows a third display example of the inspector confirmation view. In the third display example, the output control unit 33 explicitly indicates, on the photographed area indication image Im, the route information indicating the recommended route of the photographing unit of the endoscope 3 in the inspection target as the guidance information relating to the movement of the endoscope 3.

In FIG. 12, as with the first display example and the like, the output control unit 33 displays the projection standard model 40, the photographed projection area 41, the endoscope icon 42, and the photographing area icon 43 in the photographed area indication image Im.

In the third display example, the output control unit 33 displays on the projection standard model 40 a path line 53 indicating the recommended path to be passed through by the endoscope 3 (in detail, the photographing unit). In this case, for example, the path information indicating the three-dimensional recommended path of the photographing unit with reference to the standard model Ms is stored in advance in the memory 12, wherein the path information is generated based on the inspection histories of expert doctors. Then, the output control unit 33 projects the three-dimensional recommended path indicated by the path information onto the two-dimensional coordinates onto which the standard model Ms is also projected, thereby generating the path line 53 to be displayed on the photographed area indication image Im.

Further, if the output control unit 33 determines that the position of the photographing unit estimated by SfM or the like is more than a predetermined distance away from the recommended path, it outputs a predetermined attention. In the example of FIG. 12, the output control unit 33 compares the estimated position and orientation of the current photographing unit with the recommended route and then determines that the position of the photographing unit needs to be back by 3 cm. Thus, the output control unit 33 outputs an attention by displaying the text information "PLEASE BACK BY 3 cm" in the notification window 44. The output control unit 33 may output sound or warning sound by the audio output unit 16 instead of outputting the above-described attention on the inspector confirmation view.

In this way, in the third display example, the output control unit 33 can provide a guidance (navigation) to suitably support the movement of the endoscope 3 by the presentation of the recommended route on the photographed area indication image Im and the attention when it deviates from the recommended route.

Figure 13:
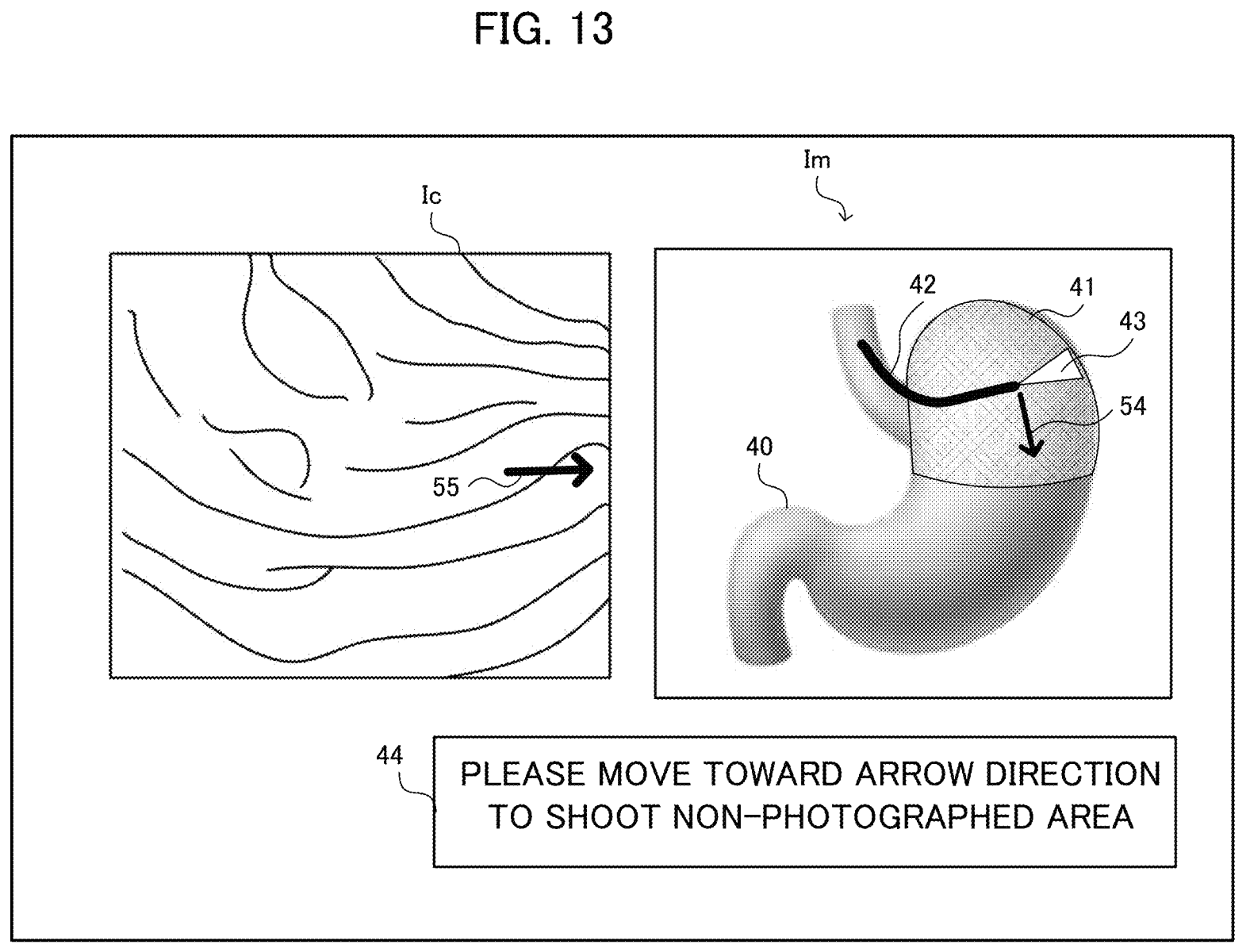

FIG. 13 shows a fourth display example of the inspector confirmation view. In the fourth display example, the output control unit 33 outputs, as guidance information relating to photographing by the endoscope 3, information for providing an guidance of the direction to the non-photographed area. In FIG. 13, as with the first display example and the like, the output control unit 33 displays the projection standard model 40, the photographed projection area 41, the endoscope icon 42, and the photographing area icon 43 in the photographed area indication image Im.

In the fourth display example, the output control unit 33 identifies the non-photographed area where the standard model Ms does not overlap with the reconstruction data Mr. Then, the output control unit 33 explicitly indicates, on the photographed area indication image Im, the direction to the non-photographed area (for example, the closest position of non-photographed area or the center position of the non-photographed area) with respect to the current photographing position estimated by the SfM or the like.

In the example of FIG. 13, since the middle part of the stomach body and the lower part of the stomach body are unphotographed areas, the output control unit 33 displays an arrow 54 indicating the direction toward the middle part of the stomach body and the lower part of the stomach body from the photographing position near the tip position of the endoscope icon 42 corresponding to the photographing position. Furthermore, the output control unit 33 similarly superimposes, on the captured image Ic, an arrow 55 indicating the direction towards the middle part of the stomach body and the lower part of the stomach body, which is an unphotographed area. Then, the output control unit 33 displays text information, in the notification window 44, indicating that the photographing unit should be moved in the direction of the arrow (here arrow 54 and arrow 55).

According to the fourth display example, the output control unit 33 can suitably guide the photographing unit to move to the non-photographed area, allowing the inspector to smoothly execute the endoscopic inspection.

Figure 14:
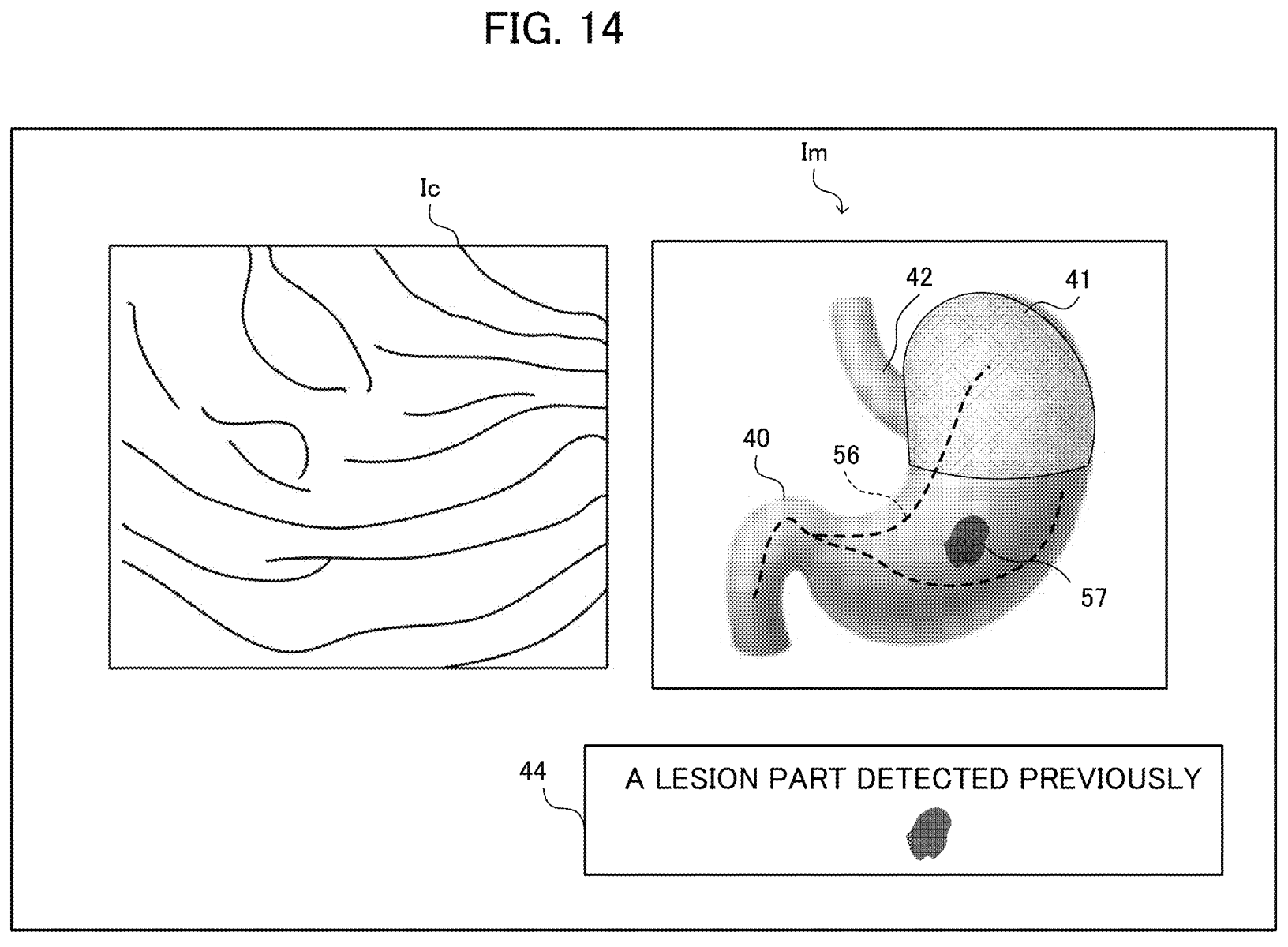

FIG. 14 shows a fifth display example of the inspector confirmation view. In the fifth display example, the output control unit 33 displays, on the photographed area indication image Im, a mark information indicating a part (mark part) of the inspection target serving as a mark, as the guidance information relating to photographing by the endoscope 3. In FIG. 14, as with the first display example and the like, the output control unit 33 displays the projection standard model 40 and the photographed projection area 41 on the photographed area indication image Im.

In the fifth display example, the output control unit 33 superimposes a mark line 56 indicating a mark part such as a main lymphatic channel, a blood vessel, and a neuron, on the projection standard model 40. In this case, for example, the relative three-dimensional position information or the like of the mark part with respect to the standard model Ms is stored in advance in the memory 12. The output control unit 33 displays the mark line 56 over the mark part on the projection standard model 40 by projecting the three-dimensional information of the mark part onto the two-dimensional coordinates onto which the standard model Ms is also projected. Further, the output control unit 33 refers to the past inspection history data of the subject from the memory 12 or the like, and then displays, on the photographed area indication image Im, a mark area 57 indicating the position of a lesion part detected in the past inspection as the position of the mark part. In this case, for example, the past inspection history data includes information indicating the location and size (or range) of the detected lesion part on the standard model Ms. Then, the output control unit 33 displays, in the notification window 44, the text information indicating that the lesion part detected in the past inspection and the mark area 57 indicating the lesion part.

According to the fifth display example, the output control unit 33 clearly indicates, on the photographed area indication image Im, such a part to be a mark in the inspection of the inspection target thereby to allow the inspector to smoothly perform the photographing of the endoscope 3.

Figure 15:
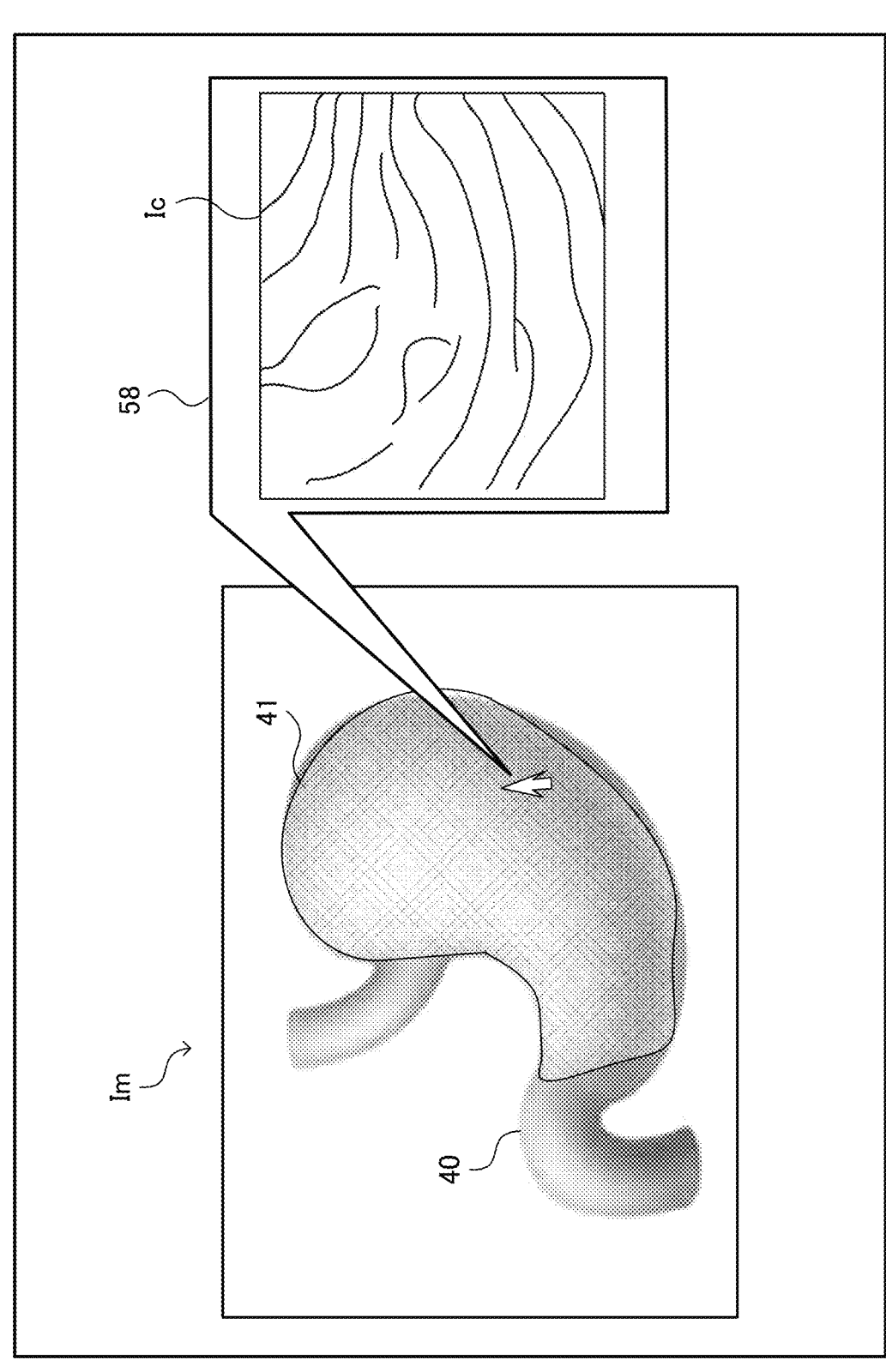
FIG. 15 illustrates a sixth display example of the inspector confirmation view.

FIG. 15 shows a sixth display example of the inspector confirmation view. In the sixth display example, if, after the end of the endoscopic inspection, an arbitrary position on the photographed projection area 41 indicating the photographed area on the photographed area indication image Im is specified by the user input, the output control unit 33 displays the captured image Ic corresponding to the specified position.

In FIG. 15, as with the first display example and the like, the output control unit 33 displays the projection standard model 40 and the photographed projection area 41 in the photographed area indication image Im. Then, the output control unit 33 receives an input for specifying an arbitrary position on the photographed projection area 41 by an input unit 14 such as a mouse. In FIG. 15, the output control unit 33, as an example, displays a cursor and receives an input that specifies an arbitrary position on the photographed projection area 41 by the cursor.

When an arbitrary position on the photographed projection area 41 is specified, the output control unit 33 extracts the captured image Ic corresponding to the specified position from the captured image storage unit 21 and displays the extracted captured image Ic in association with the specified position. In FIG. 15, the output control unit 33 displays the balloon 58 indicating the specified position, and displays the captured image Ic in the balloon 58. For example, the image processing device 1 stores, in the captured image storage unit 21, the information on the photographing position of each captured image Ic which is estimated at the time of generating of the reconstruction data Mr in associated with the each captured image Ic during the endoscopic inspection. Then, when performing the display in FIG. 15, the output control unit 33 acquire the captured image Ic to be displayed on the balloon 58 by searching the captured image storage unit 21 for the corresponding captured image Ic based on the position on the standard model Ms specified by the user. When displaying the captured image Ic on the balloon 58, the output control unit 33 may acquire the captured image Ic including the position specified by the user as the subject, instead of acquiring the captured image Ic photographed at the position specified by the user.

In this way, in the sixth display example, the image processing device 1 accepts an input for specifying an arbitrary position of the photographed area indicated in the photographed area indication image Im after the completion of the inspection. Thereby, it is possible to suitably present the photographed image Ic indicating the detailed situation of the specified position to the inspector.

(6) Modification

Next, a preferred modification will be described in the first example embodiment. The following modifications may be applied in combination to the example embodiments described above.

(First Modification)

The image processing device 1 may record the inspection duration required in the endoscopic inspection as the history information of the inspection (i.e., log information).

In this case, for example, the image processing device 1 measures a time period from the start of acquisition of the captured image Ic at step S11 of the flowchart in FIG. 5 to the determination of the end of the endoscopic inspection at step S15 as the inspection duration described above. Then, the output control unit 33 of the image processing device 1, at the time of determining that the endoscopic inspection is finished at step S15, associates the measured inspection duration with the subject identification information (e.g., patient ID) and information such as the date and stores them in the memory 12. Thus, the image processing device 1 can suitably store the inspection duration required for the inspection of the endoscopic inspection in the memory 12 (the storage device) as the log information.

(Second Modification)

After the endoscopic inspection, the image processing device 1 may generate report information indicating an implementation state or a result (performance) relating to the finished endoscopic inspection.

In this case, for example, after the determination of the end of the endoscopic inspection, the output control unit 18 of the image processing device 1 generates, as the report information, information relating to the inspection duration required in the endoscopic inspection, and/or information relating to the path through which the photographing unit of the endoscope 3 actually passed in the endoscopic inspection. Information relating to the path is, for example, time series data of the three-dimensional position information showing the movement history of the photographing unit of the endoscope 3 with reference to at least one of the standard model Ms or reconstruction data Mr. In this case, the report information may be information capable of displaying the path of the photographing unit of the endoscope 3 on a three-dimensional model of the stomach. In addition, the report information may include a variety of information indicative of the status or result of the endoscopic inspection, such as the latest reconstruction data Mr generated up to the end of the inspection. Then, the output control unit 18 stores, for example, the generated report information in the memory 12 in association with information such as the subject's identification information (e.g., patient ID) and the date information.

According to this modification, the image processing device 1 can suitably generate useful information after endoscopic inspection.

Second Example Embodiment

Figure 16:
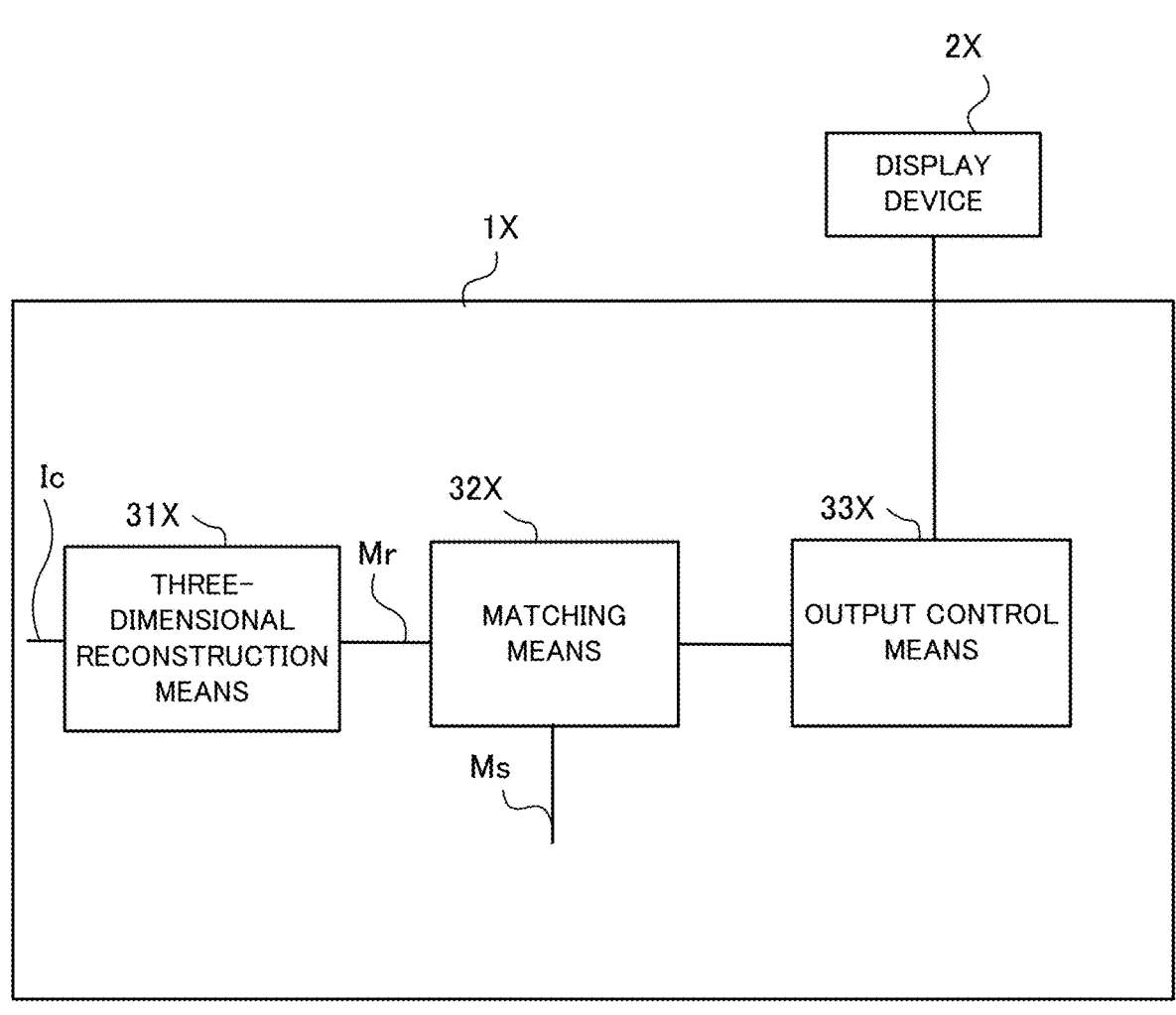
FIG. 16 is a block diagram of an image processing device according to the second example embodiment.

FIG. 16 is a block diagram of the image processing device 1X according to the second example embodiment. The image processing device 1X includes a three-dimensional reconstruction means 31X, a matching means 32X, and an output control means 33X.

The three-dimensional reconstruction means 31X generates reconstruction data "Mr" acquired by three-dimensionally reconstructing an inspection target on a basis of captured images "Ic", which a photographing unit provided in an endoscope generates by photographing the inspection target. In this case, the three-dimensional reconstruction means 31X may receive the captured images Ic directly from the photographing unit or may acquire the captured images Ic from the storage device which stores the captured images taken by the photographing unit. The term "inspection target" may be a stomach or other organs such as a large bowel. The three-dimensional reconstruction means 31X may be the three-dimensional reconstruction unit 31 according to the first example embodiment.

The matching means 32X performs matching between a standard model "Ms", which is a standard three-dimensional model of the inspection target, and the reconstruction data Mr. Here, the matching means 32X may acquire the standard model Ms from the memory of the image processing device 1X, or may acquire it from an external device different from the image processing device 1X. The matching means 32X may be the matching unit 32 according to the first example embodiment.

The output control means 33X displays on a display device 2X a photographed area indication image indicating a photographed area of the inspection target on the standard model based on a result of the matching. The output control means 33X may be the output control unit 33 according to the first example embodiment.

Figure 17:
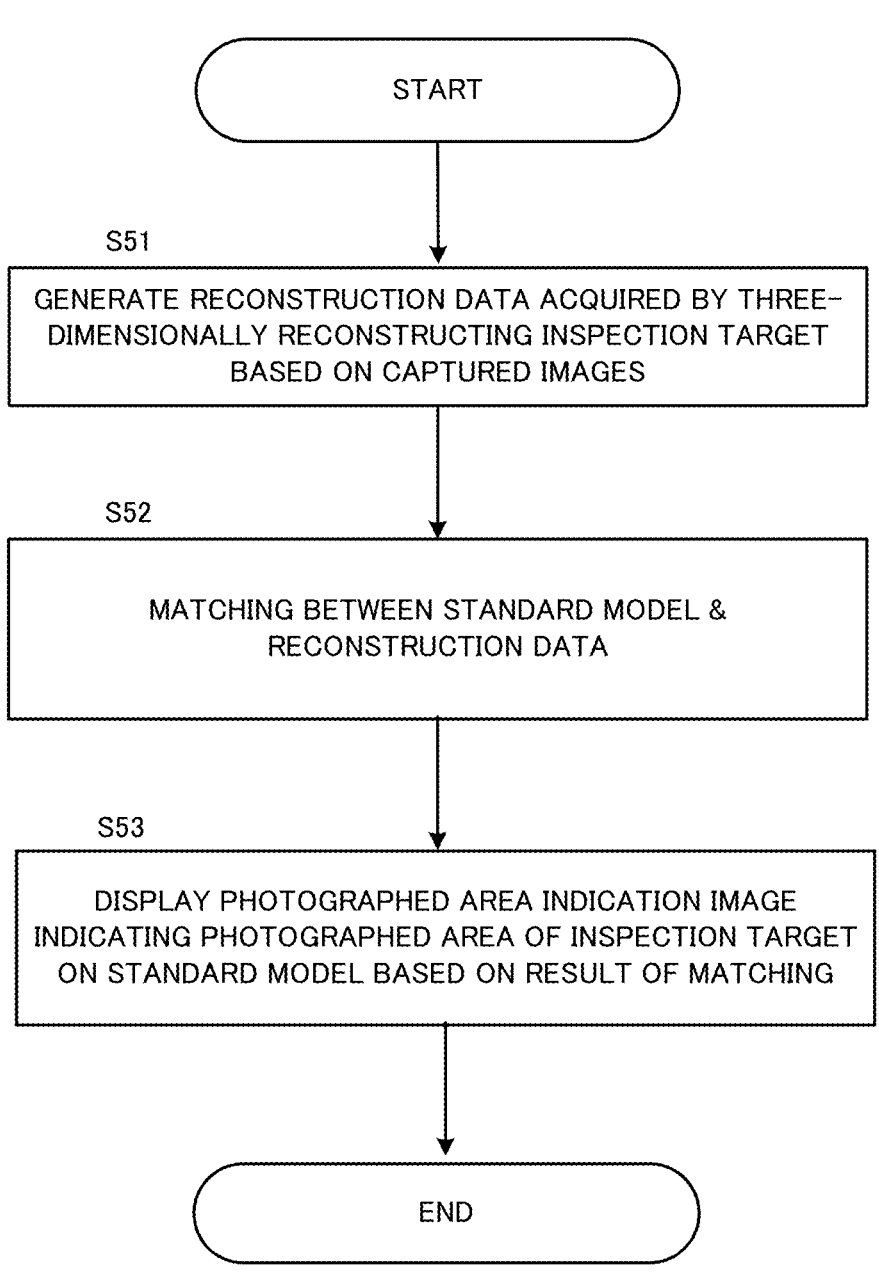
FIG. 17 is an example of a flowchart showing a process procedure of the image processing device according to the second example embodiment.

FIG. 17 is an example of a flowchart illustrating a process procedure performed by the image processing device 1X in the second example embodiment. First, the three-dimensional reconstruction means 31X generates reconstruction data Mr acquired by three-dimensionally reconstructing an inspection target on a basis of captured images Ic which a photographing unit provided in an endoscope generates by photographing the inspection target (step S51). The matching means 32X performs matching between a standard model "Ms", which is a standard three-dimensional model of the inspection target, and the reconstruction data Mr (step S52). The output control means 33X displays on a display device 2X a photographed area indication image indicating a photographed area of the inspection target on the standard model based on a result of the matching (step S53).

According to the second example embodiment, the image processing device 1X can suitably specify the photographed area on the standard model Ms, which is a standard three-dimensional model of the inspection target.

The whole or a part of the example embodiments described above (including modifications, the same applies hereinafter) can be described as, but not limited to, the following Supplementary Notes.

[Supplementary Note 1]

An image processing device comprising:

a three-dimensional reconstruction means for generating reconstruction data acquired by three-dimensionally reconstructing an inspection target on a basis of captured images which a photographing unit provided in an endoscope generates by photographing the inspection target;

a matching means for performing matching between a standard model, which is a standard three-dimensional model of the inspection target, and the reconstruction data; and an output control means for displaying on a display device a photographed area indication image indicating a photographed area of the inspection target on the standard model based on a result of the matching.

[Supplementary Note 2]

The image processing device according to Supplementary Note 1, wherein the output control means displays a latest captured image acquired from the photographing unit and the photographed area indication image side by side on the display device.

[Supplementary Note 3]

The image processing device according to Supplementary Note 1 or 2, wherein, if there is a partial area whose photographed duration is lower than a threshold value in the photographed area, the output control means outputs an attention regarding the partial area.

[Supplementary Note 4]

The image processing device according to any one of Supplementary Notes 1 to 3, wherein the output control means changes a display appearance within the photographed area based on a difference in photographed duration within the photographed area.

[Supplementary Note 5]

The image processing device according to Supplementary Note 4, wherein the output control means divides the photographed area based on the photographed duration and performs a color-coded display of the divided areas on the display device.

[Supplementary Note 6]

The image processing device according to any one of Supplementary Notes 1 to 5, wherein the output control means displays on the display device guidance information relating to movement of the photographing unit.

[Supplementary Note 7]

The image processing device according to Supplementary Note 6, wherein the output control means displays, on the photographing area indication image, photographing necessary part information indicating a part of the inspection target necessary to be photographed, as the guidance information.

[Supplementary Note 8]

The image processing device according to Supplementary Note 6 or 7, wherein the output control means displays information indicating a progress ratio of the photographing on the display device.

[Supplementary Note 9]

The image processing device according to Supplementary Note 8, wherein the output control means determines the progress ratio based on a ratio of an area that is already photographed to all area of the inspection target necessary to be photographed.

[Supplementary Note 10]

The image processing device according to any one of Supplementary Notes 6 to 9, wherein the output control means displays on the photographing area indication image path information indicating a recommended path of the photographing unit on the standard model, as the guidance information.

[Supplementary Note 11]

The image processing device according to Supplementary Note 10, wherein the output control means outputs an attention if the output control means determines that a position of the photographing unit is out of the recommended path.

[Supplementary Note 12]

The image processing device according to any one of Supplementary Notes 6 to 11, wherein the output control means displays on the photographing area indication image a mark information indicating a part serving as a mark in the inspection target, as the guidance information.

[Supplementary Note 13]

The image processing device according to Supplementary Note 12, wherein the mark information is information indicative of, on the standard model, at least one of a previously detected lesion part, a lymphatic channel, a blood vessel, and a neuron.

[Supplementary Note 14]

The image processing device according to any one of Supplementary Notes 6 to 13, wherein the output control means outputs, as the guidance information, information for providing a guidance of a direction to a non-photographed area of the inspection target.

[Supplementary Note 15]

The image processing device according to any one of Supplementary Notes 1 to 14, wherein, if a position in the photographed area is specified on the photographed area indication image, the image processing device displays a captured image corresponding to the position on the display device.

[Supplementary Note 16]

The image processing device according to any one of Supplementary Notes 1 to 15, wherein the matching means performs the matching between the standard model and the reconstruction data smoothed by removing an isolated point from vertices constituting the reconstruction data generated by the captured images.

[Supplementary Note 17]

The image processing device according to any one of Supplementary Notes 1 to 16, wherein the output control means stores, in a storage device, log information on an inspection duration required for an inspection by the endoscope.

[Supplementary Note 18]

The image processing device according to any one of Supplementary Notes 1 to 17, wherein the output control means generates report information on an inspection by the endoscope after end of the inspection.

[Supplementary Note 19]

A control method executed by a computer, the control method comprising:

generating reconstruction data acquired by three-dimensionally reconstructing an inspection target on a basis of captured images which a photographing unit provided in an endoscope generates by photographing the inspection target;

performing matching between a standard model, which is a standard three-dimensional model of the inspection target, and the reconstruction data; and displaying on a display device a photographed area indication image indicating a photographed area of the inspection target on the standard model based on a result of the matching.

[Supplementary Note 20]

A storage medium storing a program executed by a computer, the program causing the computer to function as:

a three-dimensional reconstruction means for generating reconstruction data acquired by three-dimensionally reconstructing an inspection target on a basis of captured images which a photographing unit provided in an endoscope generates by photographing the inspection target;

a matching means for performing matching between a standard model, which is a standard three-dimensional model of the inspection target, and the reconstruction data; and an output control means for displaying on a display device a photographed area indication image indicating a photographed area of the inspection target on the standard model based on a result of the matching.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1X Image processing device
2, 2X Display device
3 Endoscope
4 Server device
11 Processor
12 Memory
13 Interface
14 Input unit
15 Light source unit
16 Audio output unit
100, 100A Endoscopic inspection system

What is claimed is:

1. An image processing device comprising:

at least one memory configured to store instructions; and at least one processor configured to execute the instructions to:

generate reconstruction data acquired by three-dimensionally reconstructing an inspection target on a basis of captured images which a photographing unit provided in an endoscope generates by photographing the inspection target;

perform matching between a standard model, which is a standard three-dimensional model of the inspection target, and the reconstruction data;

detect a photographed area indication image indicating a photographed area of the inspection target on the standard model based on a result of the matching;

identify a partial area within the photographed area by comparing a imaging time of each the photographed area with a threshold value related to the imaging time, the partial area being where the imaging time is lower than the threshold value; and superimpose and display, on the standard model, the partial area, the photographed area, and an unimaged area of the inspection target.

2. The image processing device according to claim 1, wherein the at least one processor is configured to execute the instructions to display a latest captured image acquired from the photographing unit and the photographed area indication image side by side on the display device.

3. The image processing device according to claim 1, wherein the at least one processor is configured to execute the instructions to output an attention regarding the partial area.

4. The image processing device according to claim 1, wherein the at least one processor is configured to execute the instructions to change a display appearance within the photographed area based on a difference in photographed duration within the photographed area.

5. The image processing device according to claim 4, wherein the at least one processor is configured to execute the instructions to divide the photographed area based on the photographed duration and performs a color-coded display of the divided areas on the display device.

6. The image processing device according to claim 1, wherein the at least one processor is configured to execute the instructions to display on the display device guidance information relating to movement of the photographing unit.

7. The image processing device according to claim 6, wherein the at least one processor is configured to execute the instructions to display, on the photographing area indication image, photographing necessary part information indicating a part of the inspection target necessary to be photographed, as the guidance information.

8. The image processing device according to claim 6, wherein the at least one processor is configured to execute the instructions to display information indicating a progress ratio of the photographing on the display device.

9. The image processing device according to claim 8, wherein the at least one processor is configured to execute the instructions to determine the progress ratio based on a ratio of an area that is already photographed to all area of the inspection target necessary to be photographed.

10. The image processing device according to claim 6, wherein the at least one processor is configured to execute the instructions to display on the photographing area indication image path information indicating a recommended path of the photographing unit on the standard model, as the guidance information.

11. The image processing device according to claim 10, wherein the at least one processor is configured to execute the instructions to output an attention if it is determined that a position of the photographing unit is out of the recommended path.

12. The image processing device according to claim 6, wherein the at least one processor is configured to execute the instructions to display on the photographing area indication image a mark information indicating a part serving as a mark in the inspection target, as the guidance information.

13. The image processing device according to claim 12, wherein the mark information is information indicative of, on the standard model, at least one of a previously detected lesion part, a lymphatic channel, a blood vessel, and a neuron.

14. The image processing device according to claim 6, wherein the at least one processor is configured to execute the instructions to output, as the guidance information, information for providing a guidance of a direction to a non-photographed area of the inspection target.

15. The image processing device according to claim 1, wherein, if a position in the photographed area is specified on the photographed area indication image, the image processing device displays a captured image corresponding to the position on the display device.

16. The image processing device according to claim 1, wherein the at least one processor is configured to execute the instructions to perform the matching between the standard model and the reconstruction data smoothed by removing an isolated point from vertices constituting the reconstruction data generated by the captured images.

17. The image processing device according to claim 1, wherein the at least one processor is configured to execute the instructions to store, in a storage device, log information on an inspection duration required for an inspection by the endoscope.

18. The image processing device according to claim 1, wherein the at least one processor is configured to execute the instructions to generate report information on an inspection by the endoscope after end of the inspection.

19. The image processing device according to claim 1, wherein the standard model, the partial area, the photographed area, and the unimaged area, are each displayed in a different display mode.

20. A control method executed by a computer, the control method comprising:

generating reconstruction data acquired by three-dimensionally reconstructing an inspection target on a basis of captured images which a photographing unit provided in an endoscope generates by photographing the inspection target;

performing matching between a standard model, which is a standard three-dimensional model of the inspection target, and the reconstruction data;

detecting a photographed area indication image indicating a photographed area of the inspection target on the standard model based on a result of the matching;

identifying a partial area within the photographed area by comparing a imaging time of each the photographed area with a threshold value related to the imaging time, the partial area being where the imaging time is lower than the threshold value; and superimposing and displaying, on the standard model, the partial area, the photographed area, and an unimaged area of the inspection target.

21. A non-transitory computer readable storage medium storing a program executed by a computer, the program causing the computer to:

generate reconstruction data acquired by three-dimensionally reconstructing an inspection target on a basis of captured images which a photographing unit provided in an endoscope generates by photographing the inspection target;

perform matching between a standard model, which is a standard three-dimensional model of the inspection target, and the reconstruction data;

detect a photographed area indication image indicating a photographed area of the inspection target on the standard model based on a result of the matching;

identify a partial area within the photographed area by comparing a imaging time of each the photographed area with a threshold value related to the imaging time, the partial area being where the imaging time is lower than the threshold value; and superimpose and display, on the standard model, the partial area, the photographed area, and an unimaged area of the inspection target.

\* \* \* \* \*